(12) United States Patent
Yamamoto

(10) Patent No.: US 11,528,382 B2
(45) Date of Patent: Dec. 13, 2022

(54) IMAGE PROCESSING APPARATUS GENERATING OUTPUT DATA BY EDITING UNWANTED ELEMENT NEEDING COPYRIGHT PROCESSING

(71) Applicant: FUJIFILM Business Innovation Corp., Tokyo (JP)

(72) Inventor: Shinichiro Yamamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 282 days.

(21) Appl. No.: 16/726,939

(22) Filed: Dec. 26, 2019

(65) Prior Publication Data
US 2020/0389569 A1 Dec. 10, 2020

(30) Foreign Application Priority Data
Jun. 5, 2019 (JP) .............................. JP2019-105050

(51) Int. Cl.
| | | |
|---|---|---|
| H04N 1/34 | (2006.01) | |
| H04N 1/44 | (2006.01) | |
| G06F 21/10 | (2013.01) | |
| H04N 1/00 | (2006.01) | |
| G06F 3/12 | (2006.01) | |

(Continued)

(52) U.S. Cl.
CPC ........... *H04N 1/342* (2013.01); *G06F 3/1203* (2013.01); *G06F 3/1242* (2013.01); *G06F 3/1288* (2013.01); *G06F 21/10* (2013.01); *G06F 40/166* (2020.01); *G06V 30/414* (2022.01); *G06V 30/416* (2022.01); *H04N 1/00159* (2013.01); *H04N 1/00167* (2013.01); *H04N 1/32144* (2013.01); *H04N 1/444* (2013.01); *G06F 3/1243* (2013.01)

(58) Field of Classification Search
None
See application file for complete search history.

(56) References Cited

U.S. PATENT DOCUMENTS

2003/0140008 A1* 7/2003 Kawamoto ............ G06Q 30/02
705/40
2003/0225863 A1* 12/2003 Kajino ................... G06F 21/10
709/219

(Continued)

FOREIGN PATENT DOCUMENTS

JP 2017-004122 1/2017

*Primary Examiner* — Miya J Williams
*Assistant Examiner* — Miya J Cato
(74) *Attorney, Agent, or Firm* — JCIPRNET

(57) ABSTRACT

An image processing apparatus includes an acquisition section that acquires a document, a first extraction section that extracts elements that need processing regarding copyrights from elements constituting the acquired document, a second extraction section that extracts use conditions of the extracted elements, a first presenting unit that presents at least part of the extracted use conditions, a receiving section that receives designation of wanted and unwanted elements among the extracted elements, a second presenting section that presents a total fee obtained by adding fees indicated by use conditions of the wanted elements to a fee for outputting the document, and an output section that, in response to payment of the total fee, outputs the edited document. In the edited document, the unwanted elements have been edited to comply with the use conditions.

20 Claims, 26 Drawing Sheets

(51) Int. Cl.
*H04N 1/32* (2006.01)
*G06F 40/166* (2020.01)
*G06V 30/414* (2022.01)
*G06V 30/416* (2022.01)

(56) References Cited

U.S. PATENT DOCUMENTS

2014/0211247 A1* 7/2014 Matsuda ............... G06F 3/1219
358/1.15
2017/0060487 A1* 3/2017 Takeuchi .............. G06F 3/1243

* cited by examiner

FIG. 6

| DOCUMENT ID | DOCUMENT TITLE | CREATION DATE | CREATOR | NUMBER OF ELEMENTS | ELEMENT ID |
|---|---|---|---|---|---|
| 605 | 610 | 615 | 620 | 625 | 630 |
|  |  |  |  |  |  |

| ELEMENT ID | COPYRIGHT ID |
|---|---|
| 705 | 710 |
|  |  |

| COPYRIGHT ID | COPYRIGHT HOLDER | NAME | SIZE | USE CONDITION | | DISPLAY CONDITION AT NOT-USE TIME | |
|---|---|---|---|---|---|---|---|
| | | | | USE FEE | OTHERS | EDIT DETAILS | OTHERS |
| | | | | | | | |

| 905 | 910 | 915 | 920 | 925 | 930 | 935 | 940 | 945 |
|---|---|---|---|---|---|---|---|---|
| DOCUMENT ID | URL | RESERVATION NUMBER | DATE | USER | PRINT DATA | PRINTING PROPERTY | ONLY PRINTING FEE | COPYRIGHT FEE |
|  |  |  |  |  |  |  |  |  |

900

| 950 | 955 | 960 | 965 | 970 | 975 | |
|---|---|---|---|---|---|---|
| TOTAL FEE | NUMBER OF ELEMENTS OF WHICH PROCESSING REGARDING COPYRIGHTS IS NEEDED | ELEMENT ID | EDIT NECESSITY | EDIT DETAILS | ELEMENT USE FEE | ... |
|  |  |  |  |  |  |  |

FIG. 10

| PRINT ID | DOCUMENT ID | DATE | USER | TOTAL FEE | ONLY PRINTING FEE | NUMBER OF USED ELEMENTS | ELEMENT ID | USE FEE | ... |
|---|---|---|---|---|---|---|---|---|---|
| 1005 | 1010 | 1015 | 1020 | 1025 | 1030 | 1035 | 1040 | 1045 | |

FIG. 14A1
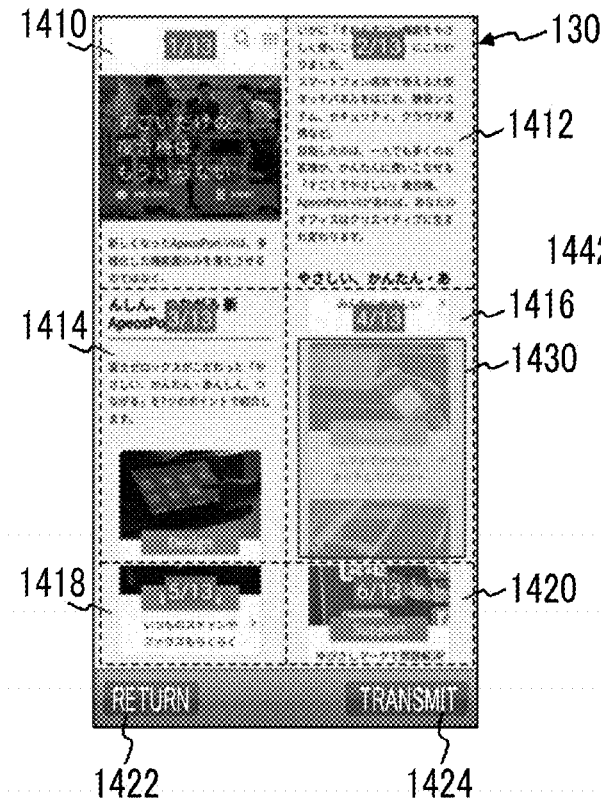
FIG. 14A2
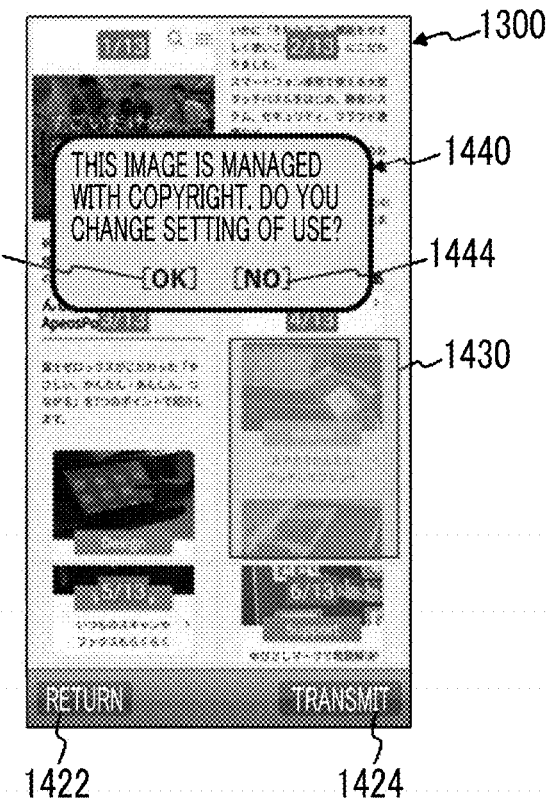
FIG. 14B
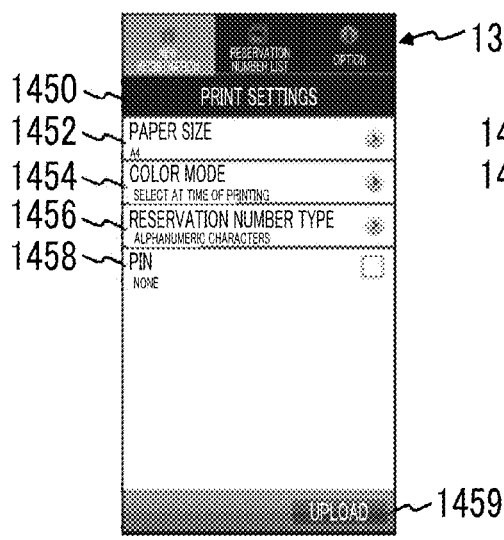
FIG. 14C
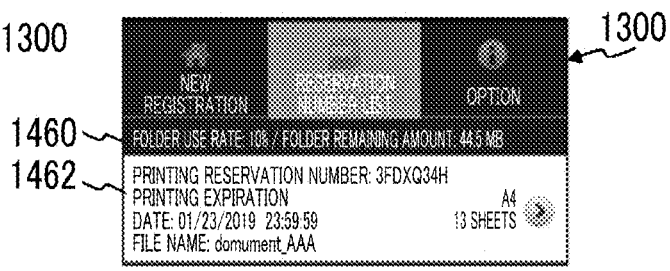

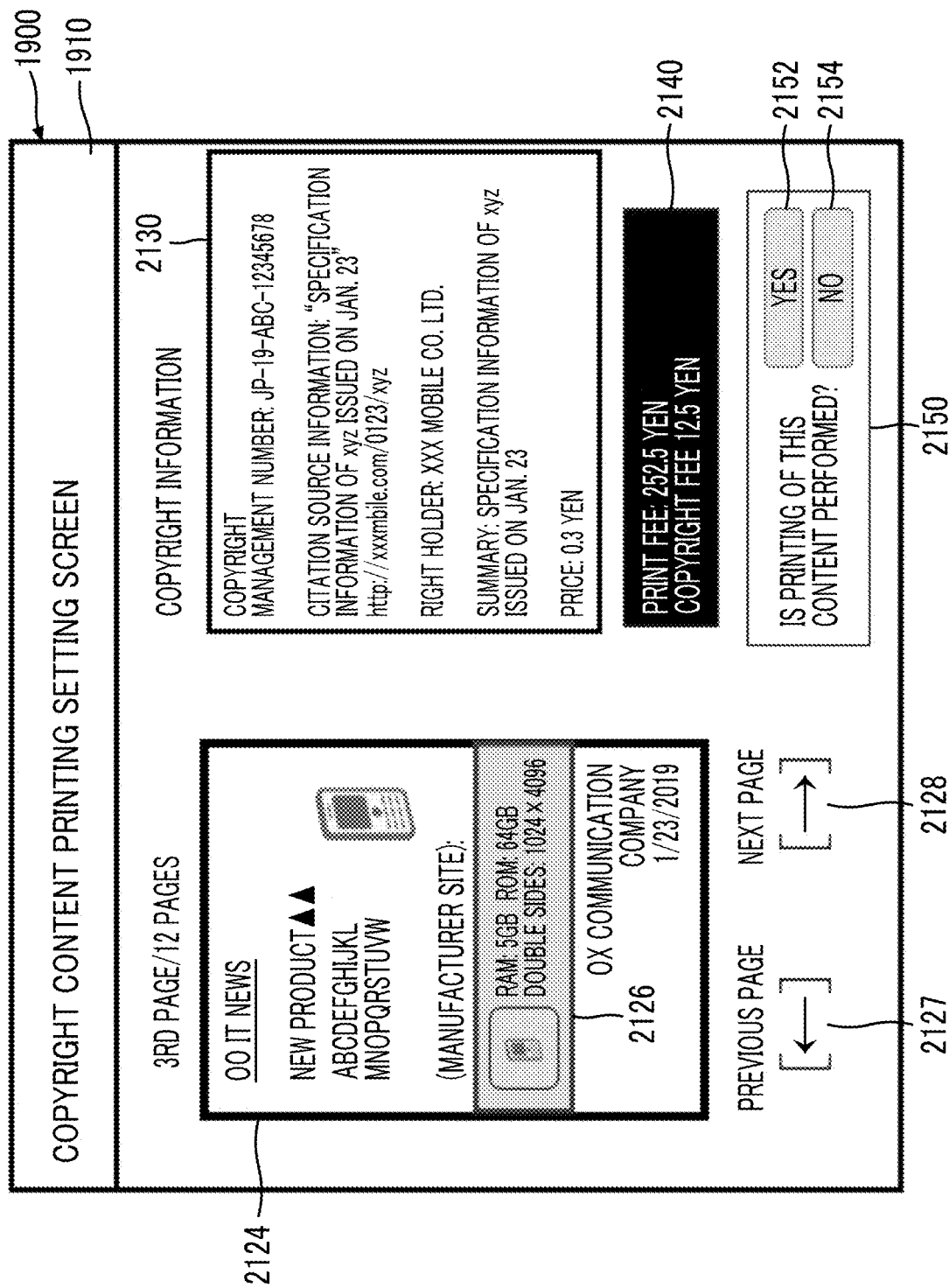

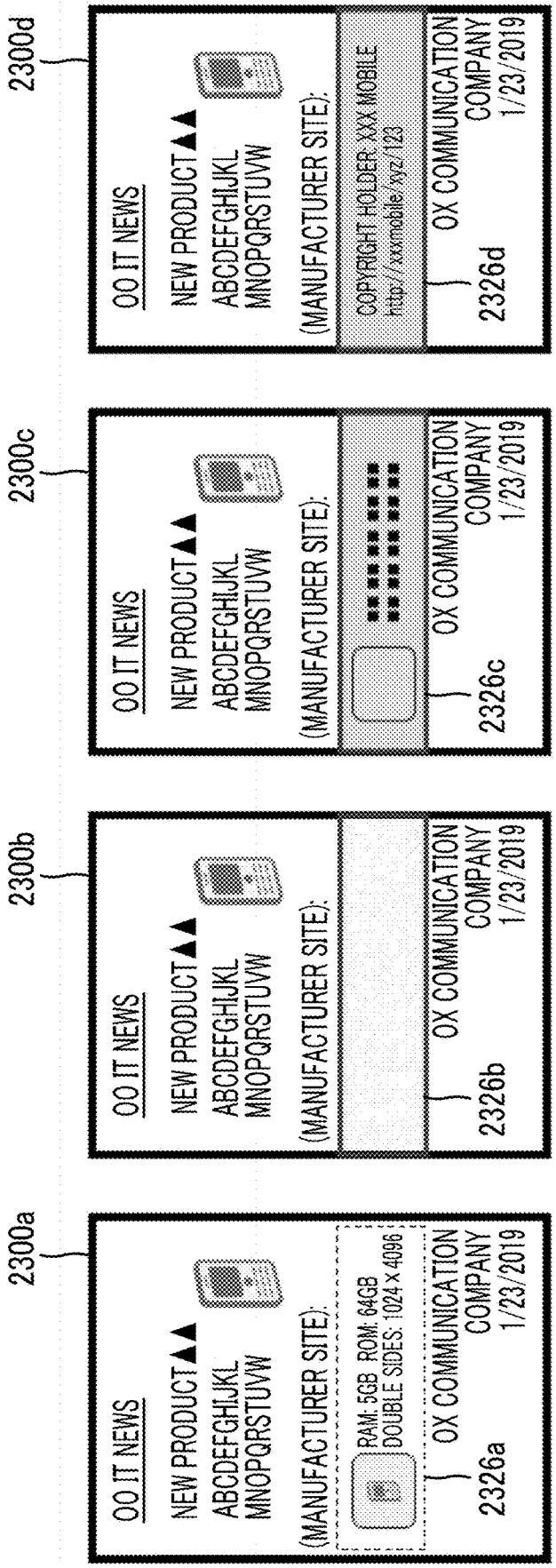

2400a 2426a
2440
2442

2400b

2426b

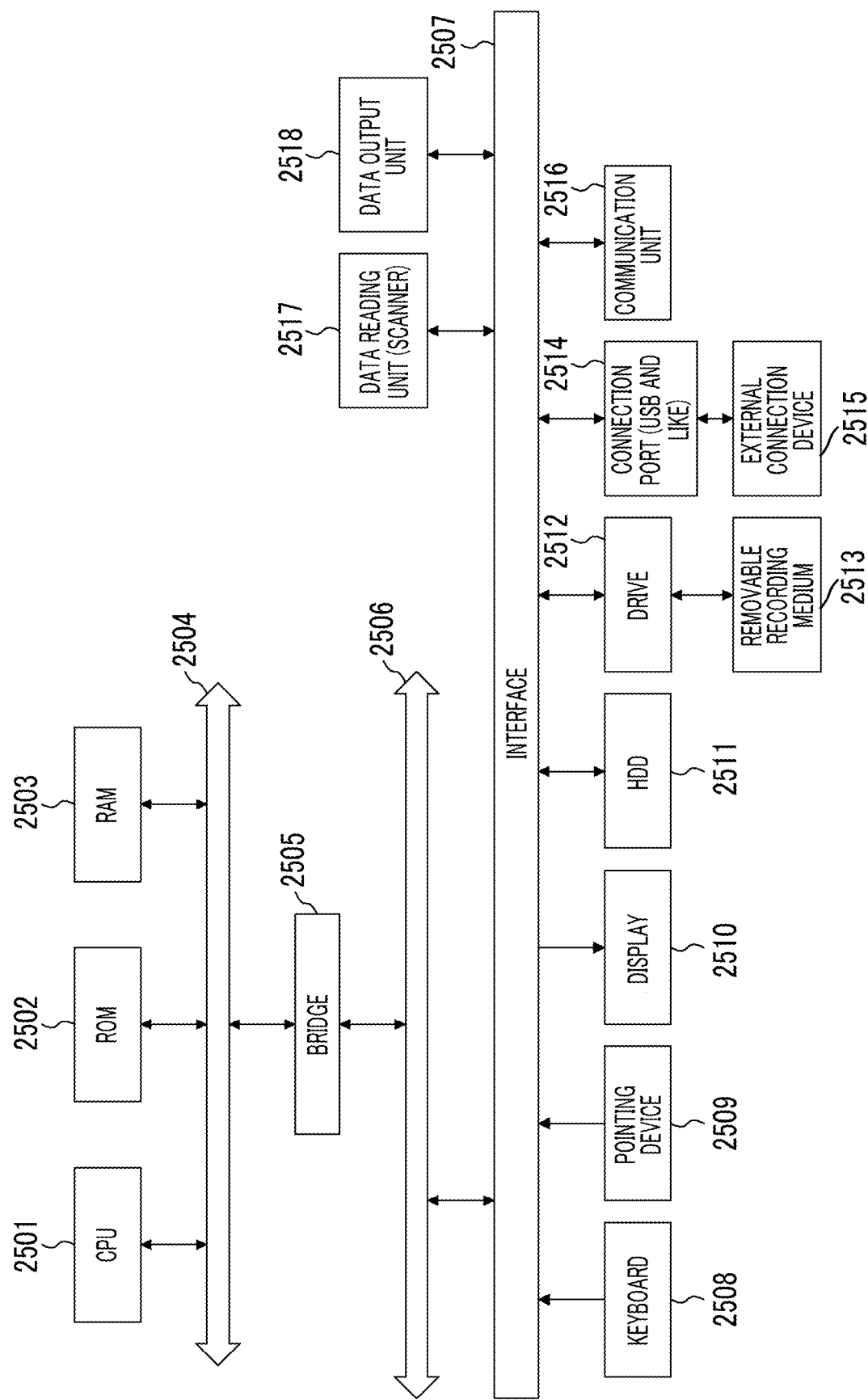

IMAGE PROCESSING APPARATUS GENERATING OUTPUT DATA BY EDITING UNWANTED ELEMENT NEEDING COPYRIGHT PROCESSING

CROSS-REFERENCE TO RELATED APPLICATIONS

This application is based on and claims priority under 35 USC 119 from Japanese Patent Application No. 2019-105050 filed Jun. 5, 2019.

BACKGROUND

(i) Technical Field

The present invention relates to an image processing apparatus.

(ii) Related Art

JP2017-004122A discloses an information processing apparatus as follows. There is a problem that, when a consumer purchases a plurality of contents of different formats, which have been created from the identical copyrighted matter, the consumer is to pay for the copyrighted matter a plurality of times. In addition, there is a problem that, when a content creator creates contents from the copyrighted matter, it is necessary to coordinate and contract with rights holders such as publishers and authors individually, and thus it takes time and effort to process such coordination and contraction. To solve the above problems, the information processing apparatus manages book subscription rights allowing using of contents with a plurality of formats. The information processing apparatus includes first registration means that registers contents created from a copyrighted matter, approval means that approves using of the contents by the book subscription right based on approval information of a right holder of the copyrighted matter, and authentication means that authenticates the consumer to hold the book subscription right based on payment information of the consumer.

SUMMARY

In a case where a document including an element that needs copyright processing is output as it is, copyright may be infringed.

Aspects of non-limiting embodiments of the present disclosure relate to an image processing apparatus in which it is possible to generate output data by editing an unwanted element, in a case of outputting a document including an element that needs copyright processing.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

The gist of the present invention for achieving the object lies in the following inventions.

According to an aspect of the present disclosure, there is provided an image processing apparatus including an acquisition section that acquires a document, a first extraction section that extracts elements that need processing regarding copyrights from elements constituting the acquired document, a second extraction section that extracts use conditions of the extracted elements, a first presenting unit that presents at least part of the extracted use conditions, a receiving section that receives designation of wanted and unwanted elements among the extracted elements, a second presenting section that presents a total fee obtained by adding fees indicated by use conditions of the wanted elements to a fee for outputting the document, and an output section that, in response to payment of the total fee, outputs the edited document. In the edited document, the unwanted elements have been edited to comply with the use conditions.

BRIEF DESCRIPTION OF THE DRAWINGS

Exemplary embodiment(s) of the present invention will be described in detail based on the following figures, wherein:

FIG. 6 is a diagram illustrating a data structure example of a document-element information table;

FIG. 7 is a diagram illustrating a data structure example of an element-copyright correspondence table;

FIG. 8 is a diagram illustrating a data structure example of a copyright use information table;

FIG. 9 is a diagram illustrating a data structure example of a target document information table;

FIG. 10 is a diagram illustrating a data structure example of a fee table;

FIGS. 14A1 to 14C are diagrams illustrating a process example according to the exemplary embodiment;

FIG. 21 is a diagram illustrating a process example according to the exemplary embodiment;

FIGS. 23A to 23D are diagrams illustrating a process example according to the exemplary embodiment;

FIG. 25 is a block diagram illustrating a hardware configuration example of a computer realizing the exemplary embodiment.

DETAILED DESCRIPTION

Hereinafter, with reference to the drawings, a description will be made of an exemplary embodiment for realizing the invention.

Figure 1:
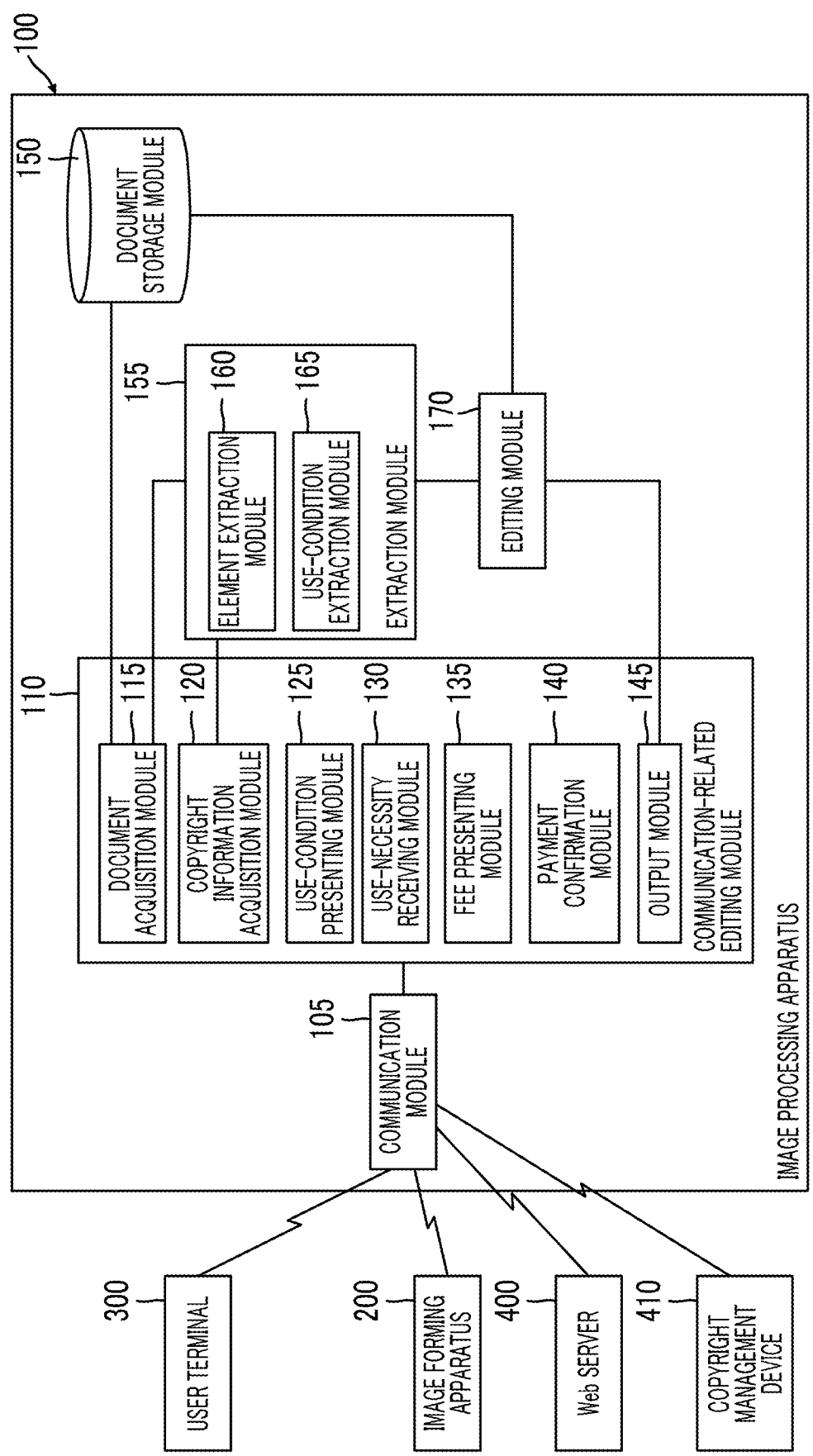
FIG. 1 is a conceptual module configuration diagram illustrating a configuration example in the exemplary embodiment (image processing apparatus)

FIG. 1 is a conceptual module configuration diagram illustrating a configuration example according to the exemplary embodiment (image processing apparatus 100).

The module generally indicates components such as software (including a computer program as an interpretation of "software") or hardware which may be logically divided. Therefore, the module in the exemplary embodiment indicates not only a module in a computer program but also a module in a hardware configuration. Therefore, in the exemplary embodiment, a description will also be made of a computer program (for example, a program causing a computer to execute each procedure, a program causing a computer to function as each means, or a program a computer to realize each function), a system, and a method for functioning as such a module. However, for convenience of description, "storing", "being stored", or words equivalent thereto are used, but, these words indicate that a storage device stores data or a storage device is controlled to store data in a case where an exemplary embodiment is a computer program. A module may correspond to a function on a one-to-one basis, and, in installation, a single module may be configured with a single program, a plurality of modules may be configured with a single program, and, conversely, a single module may be configured with a plurality of programs. The plurality of modules may be executed by a single computer, and a single module may be executed by a plurality of computers in a distributed or parallel environment. Other modules may be included in a single module. Hereinafter, the term "connection" indicates not only physical connection but also logical connection (for example, transmission and reception of data, an instruction, a reference relationship between pieces of data, login, and the like). The term "being predetermined" indicates that setting is performed prior to a target process, and indicates not only that setting is performed before a process according to the exemplary embodiment is started but also that, even after a process according to the exemplary embodiment is started, setting is performed depending on a situation or a state at the time or a situation or a state hitherto in a case where a target process is not performed. In a case where there are "a plurality of predetermined values", the values may be different from each other, and two or more values may be the same as each other ("two or more values", of course, include all of the values). The description that "in a case of A, B is performed" indicates that "it is determined whether or not A is satisfied, and, in a case where it is determined that A is satisfied, B is performed". However, this excludes a case where determination of whether or not A is satisfied is unnecessary. In a case where objects are listed such as "A, B, and C", the objects are exemplarily listed unless otherwise mentioned, and a case where only one thereof (for example, only A) is selected is included.

A system or an apparatus also includes not only a case where a plurality of computers, pieces of hardware, and apparatuses are configured to be connected to each other via communication means such as a network ("network" includes communication connection on a one-to-one basis) but also a case of being configured with a single computer, a single piece of hardware, and a single apparatus. The "apparatus" and the "system" are used as terms having an identical meaning. Of course, the "system" does not include systems that are merely a social "mechanism" (that is, social system) which is an artificial arrangement.

Target information is read from a storage device, the process is performed, and a process result is written to the storage device for each process performed by each module or for each process in a case where a plurality of processes are performed in a module. Therefore, description of reading for a storage device before a process and writing for the storage device after the process will be omitted. The storage device here may include a hard disk drive, a random access memory (RAM, for short), an external storage medium, a storage device connected via a communication line, a register in a central processing unit (CPU, for short), or the like.

The image processing apparatus 100 in the exemplary embodiment has a function to generate output data of a document. As illustrated in the example in FIG. 1, the image processing apparatus 100 includes a communication module 105, a communication-related editing module 110, a document storage module 150, an extraction module 155, and an editing module 170. In particular, the image processing apparatus 100 performs processing relating to printing of a document including a copyrighted element. For example, the image processing apparatus receives a printing reservation of a document from a user terminal 300 in accordance with an operation of a user. When the user attempts to perform printing of the document with the image forming apparatus 200, the image processing apparatus transmits document data to an image forming apparatus 200. The image forming apparatus 200 is an example of a first image processing apparatus. The image processing apparatus 100 is an example of a second image processing apparatus. The user terminal 300 is an example of a third image processing apparatus.

The communication module 105 is connected to the communication-related editing module 110 and is connected to the image forming apparatus 200, the user terminal 300, a Web server 400, and a copyright management device 410 via a communication line. The communication module 105 receives an instruction from the user terminal 300, acquires copyright information of a document or an element constituting the document from the Web server 400 or the copyright management device 410 in accordance with the instruction, and transmits generated output data to the image forming apparatus 200 in order to print the output data.

The communication-related editing module 110 includes a document acquisition module 115, a copyright information acquisition module 120, a use-condition presenting module 125, a use-necessity receiving module 130, a fee presenting module 135, a payment confirmation module 140, and an output module 145. The communication-related editing module is connected to the communication module 105. The communication-related editing module 110 controls the communication module 105 to communicate with the image forming apparatus 200, the user terminal 300, the Web server 400, and the copyright management device 410. Thus, the communication-related editing module acquires information required for generating output data and transmits the generated output data and information associated with the output data.

The document acquisition module 115 is connected to the document storage module 150 and the extraction module 155. The document acquisition module 115 acquires a document. For example, the document acquisition module 115 may receive a document transmitted from the user terminal 300. The document acquisition module may acquire a document corresponding to an instruction from the user terminal 300, from a document stored in the document storage module 150 or from the Web server 400. The document acquisition module 115 transmits information for identifying a document to the user terminal 300 as a response, such that the image forming apparatus 200 performs printing of the document.

Here, "the document" includes an element that needs processing regarding copyrights. For example, information indicating that processing regarding copyrights is needed, a tag indicating a use condition of a copyright, and the like may be embedded in the document. The use condition of a copyright refers to information indicating a use condition of an element protected by a copyright. For example, a document created by a document creation program such as a word processor may be provided in addition to a Web page described in an HTML (abbreviation of Hyper Text Markup Language) format.

"Processing regarding copyrights" means a condition for performing processing in a case where processing of outputting (for example, displaying and printing) a copyrighted element. That is, the copyrighted element refers to an element protected by a copyright. For example, the processing regarding copyrights corresponds to a case where a fee required for using the element is paid. In addition, the processing regarding copyrights may correspond to a case where the name of a creator or citation source information is added in output.

The copyright information acquisition module 120 is connected to the extraction module 155. The copyright information acquisition module 120 acquires copyright information corresponding to an element extracted by the element extraction module 160, from the copyright management device 410 through the communication module 105. The copyright information acquisition module transfers the acquired copyright information to a use-condition extraction module 165. For example, in a case where being copyright-free is described as copyright information of a target element (specifically, in a case where information of a free material, a creative commons notation, a usage mark of the Agency for Cultural Affairs, and the like is provided), it is determined that there is no restriction on printing of the element.

Here, "the element" means data constituting a document, and each element may be copyrighted. For example, the element corresponds to a figure, a table, a photograph, a paragraph, and a document region.

For example, processing as follows is performed.

(A) It is checked whether a copyright ID is embedded in an element. Specifically, in a case of an HTML document, the element corresponds to information surrounded by a tag indicating a copyright ID. That is, the copyright ID is embedded in tag information describing the element. An inquiry is transmitted to the copyright management device 410, and thus copyright information is acquired.

(B) A link in a document is checked. Specifically, it is checked whether copyright information is provided in a link destination. Since the link destination may be created by a document provider, information regarding a copyright may be provided.

The use-condition presenting module 125 presents a use condition corresponding to each element extracted by the use-condition extraction module 165. Here, "presenting" includes a case of controlling a display device of the user terminal 300 or the image forming apparatus 200 to present a use condition of each element through the communication module 105.

Specifically, the use-condition presenting module 125 controls a display for the user terminal 300 or the image forming apparatus 200, as follows.

The use-condition presenting module performs display control such that setting of whether or not printing of an element that needs processing regarding copyrights is required is possible.

A message indicating that an element that needs processing regarding copyrights is provided, and a location at which the element is provided are displayed on a document preview screen.

Further, copyright information is displayed. That is, the display control is for causing a user to determine whether or not printing is required.

Examples of the copyright information include a right holder, a copyright ID, a copyright management organization, an inquiry destination, citation source URL information of contents, and use condition information (explanation information of contents such as the summary or the abstract, and use fee). In a case where using is not possible, "printing being unavailable" or the reason is provided.

Display control is performed such that the user is allowed to set whether or not printing is required, for each element that needs processing regarding copyrights.

For example, the user may select whether or not printing is performed.

Further, display control may be performed such that selection as follows is possible in addition to the above selection.

Printing is performed in a range of a use condition in copyright information.

Printing is performed in a range described in the use condition. For example, a resolution may be lowered, a digital watermark may be superimposed, or printing of only the abstract may be performed.

The followings may be provided as options in a case of not performing printing.

A target element is deleted. Only a frame surrounding the element remains.

Description is made by superimposing citation source information (describing a URL) on an element region, or descriptions is made by superimposing copyright information. Simply, in a case where the element is deleted, contents which have been originally described are not known. Thus, information for allowing the user to refer later is superimposed, and then printing is performed.

For example, the resolution of a target element is lowered, or a digital watermark is superimposed on a target element region.

The use-necessity receiving module 130 receives a designation of wanted and unwanted elements extracted by the use-condition extraction module 165. Here, "receiving an instruction" includes a case where the use-necessity receiving module receives an instruction of use necessity of each element by an operation of a user who uses the user terminal 300 or the image forming apparatus 200, through the communication module 105. That is, an instruction of whether the user wants to use or may not use an element protected by a copyright may be performed.

The fee presenting module 135 presents the total fee obtained by adding a fee indicated by a use condition corresponding to the wanted element, to a fee for outputting a target document. Here, "presenting" includes a case of controlling the display device of the user terminal 300 or the image forming apparatus 200 to present the total fee for outputting the document through the communication module 105.

"The fee for outputting the document" refers to a fee required for outputting a document in which there is no element that needs processing regarding copyrights (or a document in a case where, even though an element that needs processing regarding copyrights is provided, an instruction that using of all the elements is not required is received). That is, the above fee refers to a fee required for an output in a case where there is no fee for processing regarding copyrights. Specifically, the above fee refers to a fee determined by the number of output sheets, color or monochrome output, paper size, or the like.

"The total fee" refers to a fee required when a target document is output. The total fee is the sum of "the fee for outputting a document" and "the fee required when an element that needs processing regarding copyrights is used, which are described above. In a case where a plurality of elements that need processing regarding copyrights are provided, a fee for each of the elements is added.

Specifically, the fee presenting module 135 performs a fee display control as follows on the user terminal 300 or the image forming apparatus 200.

The fee presenting module displays the total fee by adding a fee to a printing fee in accordance with whether or not printing of an element that needs processing regarding copyrights is required.

The fee presenting module may separately display only a use amount of money for a copyright in the total fee.

In a case where the copyright management organization with which the user has a contract pays in advance, or in a case where the copyright management organization is capable of making a payment, an account in the copyright management organization may be input. In a case where the account is input, the copyright management organization is notified to use the account with the ID of the element that needs processing regarding copyrights, and the amount necessary for this use is deducted from the amount already paid. In a case where a site that creates and manages documents, articles, and contents by citing elements to need processing regarding copyrights is capable of performing payment to the copyright management organization, the payment may be entrusted to this site. For example, in a case where the citation source is Facebook (registered trademark), Facebook may be capable of performing payment.

For example, an individual copyright holder may be
   capable of using an inter-individual online payment platform. For example, barcode payment may be performed with a mobile terminal.
A copyright use fee may be set to be free by performing "printing with an advertisement".

The payment confirmation module 140 confirms that the total fee presented by the fee presenting module 135 is paid. Here, "confirmation of payment" is performed by receiving a notification that a fee for outputting the document is paid by the user, from the image forming apparatus 200. For example, a fee is paid with a fee collector (including a so-called coin kit) provided in the image forming apparatus 200 (including payment with a coin, payment with an IC card, payment with a credit card, and the like), and thus the image processing apparatus 100 receives a notification that payment has been made, from the image forming apparatus 200.

The output module 145 is connected to the editing module 170. In a case where the payment confirmation module 140 confirms payment of the fee, the output module 145 generates output data by replacing the unwanted element, with a result obtained by the editing module 170 editing the element. Then, the output module outputs the generated output data to the image forming apparatus 200. Specifically, the output module transmits the output data to the image forming apparatus 200 through the communication module 105. That is, an output destination in "outputting the output data" is the image forming apparatus 200.

Here, "outputting" includes, for example, a form of controlling a printing device to print print data, a form of controlling a display device to display display data, and a form of controlling a speaker to output sound data.

The output module 145 may delete cause processing of deleting an unwanted element to be performed.

Here, "processing of deleting an element" may be processing of causing the element not to be included in a document to be output, and includes processing of making a region of the element to be blank, processing of replacing the element with another image (for example, black region), and the like.

The output module 145 may degrade the unwanted element.

Here, "degrading" may be processing of degrading the element to the extent that it is not possible to visually recognize the details, and includes, for example, processing of lowering the resolution of the element, and processing of performing predetermined masking on the element.

The output module 145 may replace the unwanted element with management information related to a copyright of the unwanted element.

The output module 145 may add management information related to a copyright of the wanted element.

The use-necessity receiving module 130 may be capable of receiving an instruction to output the element with an advertisement.

In a case where the use-necessity receiving module 130 receives an instruction to output an element with an advertisement, the output module 145 may generate output data including the element and the advertisement.

The output module 145 may generate output data in which the advertisement is disposed at the margin portion of the document.

The output module 145 may perform editing with an editing method of which an instruction is received in accordance with a use condition.

The editing method may include superimposition of a digital watermark on a region of the unwanted element.

The editing method may include change to a resolution designated by the editing method.

The document storage module 150 is connected to the document acquisition module 115 of the communication-related editing module 110 and the editing module 170. The document storage module 150 stores a document as a printing target.

The extraction module 155 includes the element extraction module 160 and the use-condition extraction module 165 and is connected to the document acquisition module 115 of the communication-related editing module 110, the copyright information acquisition module 120, and the editing module 170. The extraction module 155 performs processing relating to the element in a document.

The element extraction module 160 extracts an element constituting a document acquired by the document acquisition module 115. The extraction module extracts an element that needs processing regarding copyrights among extracted elements, by using copyright information acquired by the copyright information acquisition module 120.

The use-condition extraction module 165 sets an element extracted by the element extraction module 160 as a target, and extracts a use condition of the target element from the copyright information acquired by the copyright information acquisition module 120. As described above, in a case where the copyright information is embedded in a document, the use-condition extraction module may extract a use condition of a copyright of each element from the copyright information.

Specifically, the use-condition extraction module 165 performs processing as follows.

In a case where an element that needs processing regarding copyrights is extracted, the use-condition extraction module acquires a use condition. For example, in a case where a use condition is described in the extracted portion, the use-condition extraction module acquires the use condition. In a case where an inquiry destination (URL and the like) for the copyright holder is described in the extracted portion, the use-condition extraction module accesses the inquiry destination to acquire information (text document in which a license is described, and the like) of the use condition.

In a case where an inquiry destination to the copyright management device 410 being a copyright management server is described in the extracted portion, the use-condition extraction module transmits an inquiry to the copyright management device 410.

Information transmitted to the copyright management device 410 includes information as follows.

(1) Copyright ID described in the extracted portion
(2) Use state: printing
(3) Purpose of use: personal use, educational use, commercial use, and the like
(4) User information: (in a case where any is provided) information of a user attempting to perform printing The use-condition extraction module acquires the use condition from the copyright management device 410 based on the above types of information.

An example of the use condition is as follows.

Free printing is available. A condition for a copyright notation or a citation source notation, and a condition of adding a digital watermark, and the like may be provided.

Printing for a fee is available. This is a use fee for printing.

Printing as it is is not possible. Specifically, in a case where an instruction that using is not required is received, a target element is converted to have a predetermined resolution, and then printing is possible. Alternatively, printing of only the summary of the target element is possible.

In a case where a user processes payment of a use fee to the copyright management organization in advance, a response indicating that the use fee is free may be transmitted.

The editing module 170 is connected to the output module 145 of the communication-related editing module 110, the document storage module 150, and the extraction module 155. The editing module 170 performs processing on the unwanted element to comply with the use condition corresponding to the element.

Here, "processing to comply with the use condition corresponding to the element" means that an editing method in a case where using is not required is designated in the use condition, and thus processing is performed in accordance with the designated editing method. For example, in a case where using is not required, deleting the element (that is, making the element be a blank region), lowering the resolution of the element, and performing predetermined masking on the element are provided.

"Replacing the element" means that data corresponding to the element is deleted from the document in a case of deleting the element. Alternatively, deleting means replacement with null data.

Regarding a wanted element, output data of the document including the element as it is is output. That is, the output data of the document is output without editing the element.

The image forming apparatus 200 is connected to the communication module 105 in the image processing apparatus 100 via the communication line. The image forming apparatus 200 receives output data from the image processing apparatus 100 and outputs the output data. Examples of the image forming apparatus 200 include a printer and a multi-function peripheral (image processing apparatus having any two or more functions of a scanner, a printer, a copier, a facsimile, and the like). In this case, "outputting output data" corresponds to a case of printing output data.

The user terminal 300 is connected to the communication module 105 in the image processing apparatus 100 via the communication line. The user terminal 300 is used by the user to receive an instruction to output a document and the like, and transmit the instruction to the image processing apparatus 100. Examples of the user terminal 300 include a personal computer, a portable information communication device such as a smartphone, and an information appliance.

The Web server 400 is connected to the communication module 105 in the image processing apparatus 100 via the communication line. The Web server 400 stores a document and elements constituting the document. For example, the Web server publishes a document and elements constituting the document by using Web pages, and transmits the document and the elements constituting the document to the image processing apparatus 100.

The copyright management device 410 is connected to the communication module 105 in the image processing apparatus 100 via the communication line. The copyright management device 410 manages copyright information of a document or an element constituting the document. The copyright management device transmits the copyright information of an element to the image processing apparatus 100.

Figure 2:
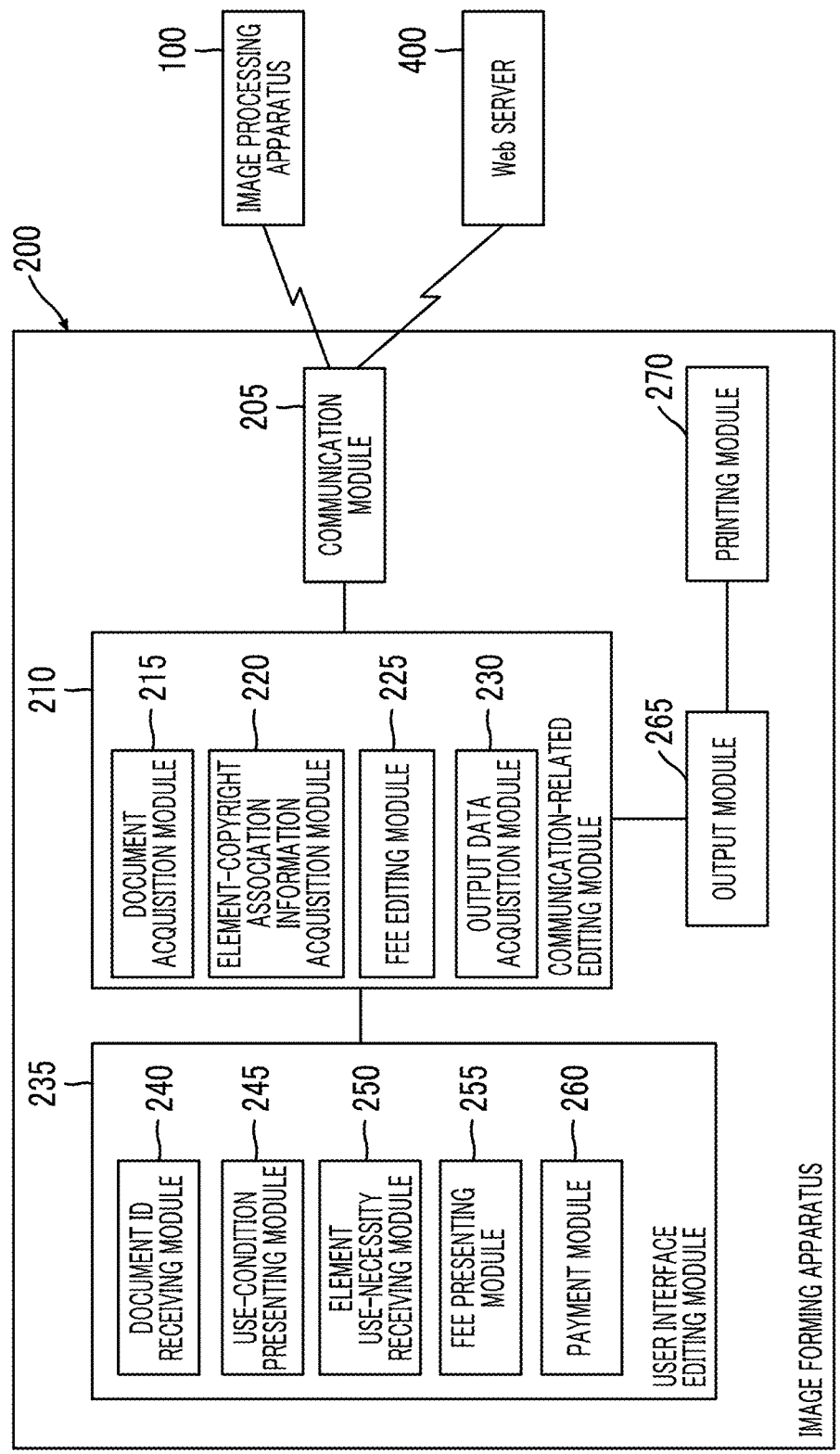
FIG. 2 is a conceptual module configuration diagram illustrating a configuration example in the exemplary embodiment (image forming apparatus)

FIG. 2 is a conceptual module configuration diagram illustrating a configuration example in the exemplary embodiment (image forming apparatus 200).

The image forming apparatus 200 includes a communication module 205, a communication-related editing module 210, a user interface editing module 235, an output module 265, and a printing module 270.

The communication module 205 is connected to the communication-related editing module 210 and is connected to the image processing apparatus 100 and the Web server 400 via the communication line. The communication module 205 transmits an instruction by an operation of the user to the image processing apparatus 100 or acquires a document from the Web server 400.

The user interface editing module 235 includes a document ID receiving module 240, a use-condition presenting module 245, an element use-necessity receiving module 250, a fee presenting module 255, and a payment module 260. The user interface editing module is connected to the communication-related editing module 210. The user interface editing module 235 receives an operation of the user. Here, the user refers to a user using the user terminal 300. Examples of the user interface device in the image forming apparatus 200 includes a touch panel, a display device (for example, liquid crystal display and an organic EL display), a keyboard, and a mouse. "Presenting" performed by the user interface editing module 235 means presenting to the touch panel or the display device in the image forming apparatus 200.

The document ID receiving module 240 receives a document ID. The user who makes a reservation of document printing with the user terminal 300 inputs a document ID with the user interface device.

The use-condition presenting module 245 presents a use condition of a copyright of an element that needs processing regarding copyrights among elements constituting a document identified by the document ID received by the document ID receiving module 240. Specifically, the use-condition presenting module may present the use condition of each element using copyright information of each, which has been acquired by an element-copyright association information acquisition module 220.

The use-condition presenting module 245 may display a target document in such manner that an element that needs processing regarding copyrights is distinguishable from other elements.

The use-condition presenting module 245 may display the element along with management information related to a copyright of the element that needs processing regarding copyrights.

Here, "the management information" includes any one of a copyright management number, information about a copyright holder, citation source information, and summary information.

The use-condition presenting module 245 may present a fee required for outputting an element that needs processing regarding copyrights, as the use condition of a copyright.

The element use-necessity receiving module 250 receives a designation of wanted and unwanted elements. The user inputs the use necessity of each element that needs processing regarding copyrights by using the user interface device.

The fee presenting module 255 presents the total fee obtained by adding a fee indicated by a use condition corresponding to the wanted element, to a fee for outputting the document.

The fee presenting module 255 may present the total fee for the wanted element.

Here, "the total fee" refers to the total fee of a fee required as a result of the processing regarding copyrights and does not include "the fee for outputting the document" described above.

The payment module 260 processes payment of the total fee presented by the fee presenting module 255. As described above, for example, the payment module detects that the fee is paid by the fee collector in the image forming apparatus 200. Payment may be made by using electronic money, inputting a replacement destination, or the like.

The communication-related editing module 210 includes a document acquisition module 215, the element-copyright association information acquisition module 220, a fee editing module 225, and an output data acquisition module 230.

The communication-related editing module is connected to the communication module 205, the user interface editing module 235, and the output module 265. The communication-related editing module 210 receives an operation of the user from the user interface editing module 235, receives output data and the like from the image processing apparatus 100 in accordance with the instruction, and transfers the output data to the output module 265.

The document acquisition module 215 transmits information (also referred to as a document ID below) which is used for identifying a document and is received by the document ID receiving module 240, to the image processing apparatus 100 through the communication module 205. The document acquisition module receives a location (for example, URL) in which a document corresponding to the document ID or the document corresponding to the document ID is stored, from the image processing apparatus 100. The document acquisition module acquires the document from the Web server 400 corresponding to the location. The document to be acquired may be a reduced image (thumbnail image). In this case, the reduced image may be displayed in the display device in the image forming apparatus 200 in order to cause the user to check the document as a printing target.

The element-copyright association information acquisition module 220 acquires an element constituting the document acquired by the document acquisition module 215 and copyright information of the element. Specifically, the element-copyright association information acquisition module 220 may receive copyright information acquired by the copyright information acquisition module 120 in the image processing apparatus 100 and the use condition of each element, which has been extracted by the use-condition extraction module 165. The element-copyright association information acquisition module 220 may perform processing equivalent to those of the copyright information acquisition module 120 and the extraction module 155 in the image processing apparatus 100.

The fee editing module 225 performs processing of a fee required for outputting the document. For example, in a case where a fee for using an element is provided in copyright association information acquired by the element-copyright association information acquisition module 220, the fee editing module 225 may calculate a fee for performing printing of the document, or may acquire a fee for performing printing of the document from the image processing apparatus 100 through the communication module 205.

The output data acquisition module 230 acquires output data from the image processing apparatus 100. Specifically, the output data acquisition module acquires output data processed by the editing module 170 in the image processing apparatus 100.

The output module 265 is connected to the communication-related editing module 210 and the printing module 270. The output module 265 edits an unwanted element as specified by the use condition corresponding to the element. The output module generates output data by replacing the element with the processed element and outputs the generated output data.

Here, regarding "the generated output data", the image processing apparatus 100 that provides a printing service generates the output data.

The output destination in "outputting the output data" is the printing module 270. Thus, here, "an output" includes printing on paper.

The printing module 270 is connected to the output module 265. The printing module 270 performs printing in accordance with the output data received from the output module 265.

The image processing apparatus 100 is connected to the communication module 205 in the image forming apparatus 200 via the communication line.

The Web server 400 is connected to the communication module 205 in the image forming apparatus 200 via the communication line.

Figure 3:
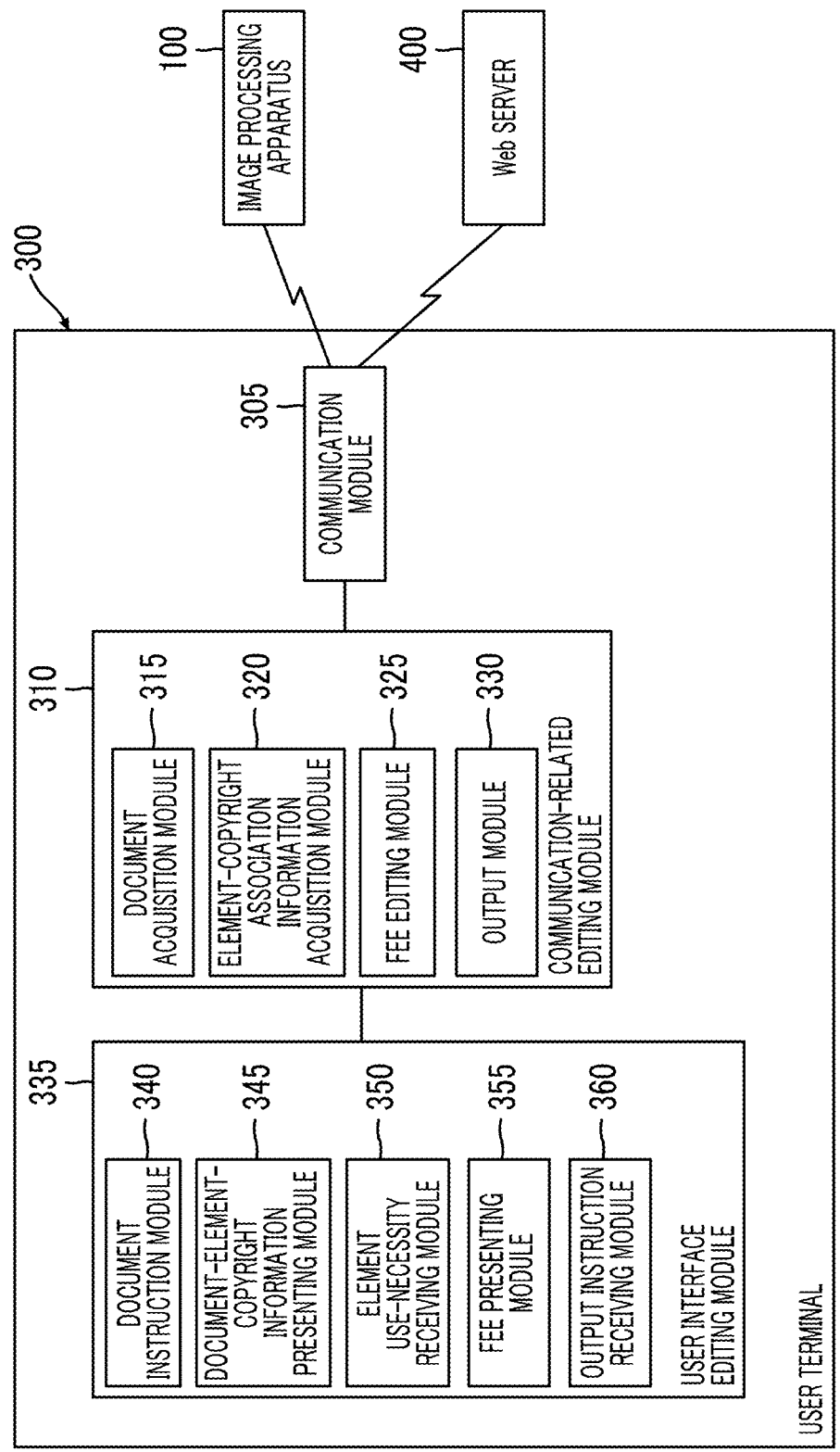
FIG. 3 is a conceptual module configuration diagram illustrating a configuration example in the exemplary embodiment (user terminal)

FIG. 3 is a conceptual module configuration diagram illustrating a configuration example in the exemplary embodiment (user terminal 300).

The user terminal 300 includes a communication module 305, a communication-related editing module 310, and a user interface editing module 335.

The communication module 305 is connected to the communication-related editing module 310 and is connected to the image processing apparatus 100 and the Web server 400 via the communication line. The communication module 305 transmits an instruction by an operation of the user to the image processing apparatus 100, receives information for identifying a document to present the received information to the user, or acquires the document from the Web server 400.

The user interface editing module 335 includes a document instruction module 340, a document-element-copyright information presenting module 345, an element use-necessity receiving module 350, a fee presenting module 355, and an output instruction receiving module 360. The user interface editing module is connected to the communication-related editing module 310. The user interface editing module 335 receives an operation of the user. Here, the user refers to a user using the image forming apparatus 200. Examples of the user interface device in the user terminal 300 includes a touch panel, a display device (for example, liquid crystal display and an organic EL display), a keyboard, and a mouse. "Presenting" performed by the user interface editing module 335 means presenting to the touch panel or the display device in the user terminal 300.

The document instruction module 340 performs an instruction of a document. The user performs an instruction of a document as a target of a printing reservation. The document instruction module 340 receives an instruction of the document by the user.

The document-element-copyright information presenting module 345 presents a use condition of a copyright of an element that needs processing regarding copyrights among elements constituting the document of which the instruction is received from the document instruction module 340.

The document-element-copyright information presenting module 345 may display a target document in such manner that an element that needs processing regarding copyrights is distinguishable from other elements.

The document-element-copyright information presenting module 345 may display an element along with management information related to a copyright of the element that needs processing regarding copyrights.

Here, "the management information" includes any one of a copyright management number, information about a copyright holder, citation source information, and summary information.

The document-element-copyright information presenting module 345 may present a fee required for outputting an element that needs processing regarding copyrights, as the use condition of a copyright.

The element use-necessity receiving module 350 receives a designation of wanted and unwanted elements that need processing regarding copyrights. The user checks the use condition of each element, which has been presented by the document-element-copyright information presenting module 345 and performs an instruction of whether or not to use the element (for example, whether or not to set the element as a printing target).

The fee presenting module 355 presents the total fee obtained by adding a fee indicated by a use condition corresponding to the wanted element, to a fee for outputting the document.

The fee presenting module 355 may present the total fee for the wanted element.

Here, "the total fee" refers to the total fee of a fee required as a result of the processing regarding copyrights and does not include "the fee for outputting the document" described above.

The output instruction receiving module 360 generates an output request for the document. The output request includes use necessity information of each element (of which an instruction is received), which has been received by the element use-necessity receiving module 350. The output instruction receiving module transfers the output request to the output module 330.

The communication-related editing module 310 includes a document acquisition module 315, an element-copyright association information acquisition module 320, a fee editing module 325, and an output module 330. The communication-related editing module 310 is connected to the communication module 305 and the user interface editing module 335. The communication-related editing module 310 receives an operation of the user from the user interface editing module 335. The communication-related editing module transmits designation of the document as a target of an output reservation to the image processing apparatus 100 in accordance with the instruction and receives information for identifying the document and the like.

The document acquisition module 315 transmits the document of which an instruction is received from the document instruction module 340 or a location (for example, URL) in which the document is stored, to the image processing apparatus 100 through the communication module 305.

The element-copyright association information acquisition module 320 extracts an element constituting the document, from the document of which the instruction is received from the document instruction module 340, and extracts copyright information of the extracted element. Specifically, the element-copyright association information acquisition module 320 may receive copyright information acquired by the copyright information acquisition module 120 in the image processing apparatus 100 and the use condition of each element, which has been extracted by the use-condition extraction module 165. The element-copyright association information acquisition module 320 may perform processing equivalent to those of the copyright information acquisition module 120 and the extraction module 155 in the image processing apparatus 100.

The fee editing module 325 performs processing of a fee required for outputting the document. For example, in a case where a fee for using an element is provided in copyright association information acquired by the element-copyright association information acquisition module 320, the fee editing module 325 may calculate a fee for performing printing of the document, or may acquire a fee for performing printing of the document from the image processing apparatus 100 through the communication module 305.

The output module 330 outputs the output request generated by the output instruction receiving module 360.

Here, the output destination in "outputting the output request" is the image processing apparatus 100.

The image processing apparatus 100 is connected to the communication module 305 in the user terminal 300 via the communication line.

The Web server 400 is connected to the communication module 305 in the user terminal 300 via the communication line.

Figure 4:
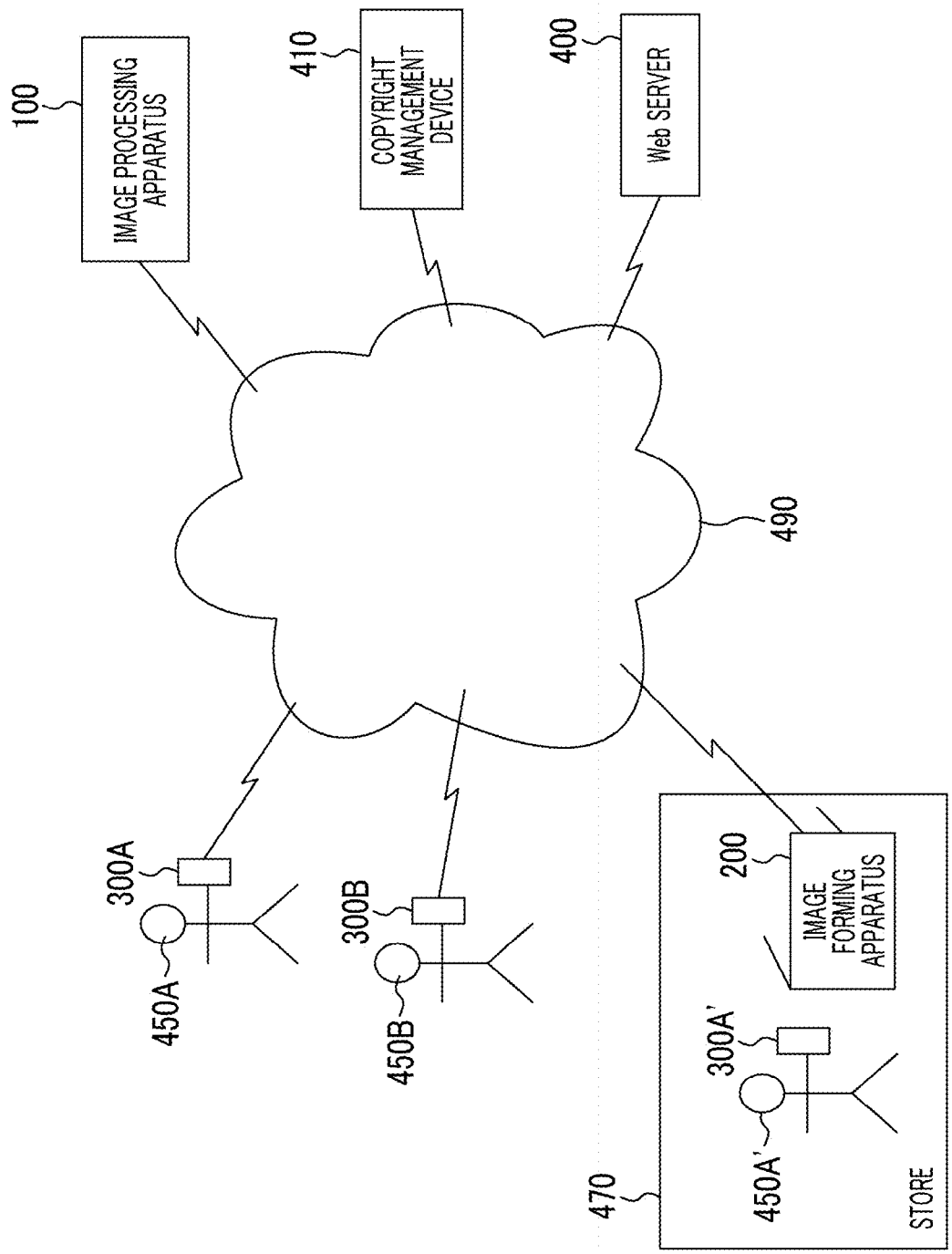
FIG. 4 is a diagram illustrating a system configuration example using the exemplary embodiment.

FIG. 4 is a diagram illustrating a system configuration example using the exemplary embodiment.

The image processing apparatus 100, the image forming apparatus 200, a user terminal 300A held by a user 450A, a user terminal 300B held by a user 450B, the Web server 400, and the copyright management device 410 are connected to each other via a communication line 490. The image forming apparatus 200 is installed in a store 470.

A printing service of charging and performing printing of a document created by the image forming apparatus 200 or a document on a network (for example, Web page) is developed by the image forming apparatus 200 which is installed in the store 470 such as a convenience store and has a function of a printer.

For example, in a case where document data created by the image forming apparatus is uploaded to the image processing apparatus 100 being a management server of a printing service on the network, a printing number for the uploaded document is issued. In a case where the printing number is input to the image forming apparatus 200 installed in the store 470, the corresponding document is downloaded, and a fee depending on print information (color/monochrome, paper size, number of sheets on which printing is performed, and the like) of the document is calculated. In a case where the user processes payment of the fee, printing is performed.

Descriptions will be made with the example in FIG. 4. The user 450A uploads a document desired to perform printing to the image processing apparatus 100 using the user terminal 300A. At this time, the image processing apparatus 100 transmits a number (example of information for identifying the document) for identifying the document desired to perform printing, to the user terminal 300A. The information is stored in the user terminal 300A.

The user 450A (user 450A' in FIG. 4) enters into the store 470. The user 450A' inputs the number for identifying the document desired to perform printing to the image forming apparatus 200 while looking at the number in a user terminal 300A' (identical to the user terminal 300A). The image forming apparatus 200 transmits the input number to the image processing apparatus 100. The image processing apparatus 100 transmits a document corresponding to the number, to the image forming apparatus 200. The image forming apparatus 200 receives the document corresponding to the number, from the image processing apparatus 100. The image forming apparatus 200 calculates a fee in accordance with a printing instruction (including color/monochrome, paper size, number of sheets on which printing is performed, and the like) of the user 450A'. In response to payment of the fee, the image forming apparatus performs printing of the document.

In this example, the user 450A' inputs the number for identifying the document desired to perform printing while looking at such a number in the user terminal 300A'. However, it is not necessary that the user 450A' holds the user terminal 300A'. The number for identifying the document desired to perform printing may be stored or described in a memo or the like so long as the number is allowed to be input to the image forming apparatus 200.

For example, the user 450A may make a reservation for performing printing of a document including an element that needs processing regarding copyrights to the image processing apparatus 100 using the user terminal 300A, in order to perform printing of the document.

In "Amendment of the copyright law" of the EU, service providers who handle contents having a great impact on Internet users around the world are obligated to manage the copyright for the content of the Web site.

In the above-described printing service, a Web page may be set to be a printing target document. Specifically, when the user 450 attempts to perform a printing instruction to the printing service of the image processing apparatus 100, the user 450 inputs a URL of a Web page desired to perform printing. At this time, the image processing apparatus 100 as the server of the printing service acquires the Web page of the input URL from the Web server 400 and converts the Web page into print data. The image processing apparatus issues a number in a manner similar to the above description. In a case where the user 450 inputs the issued number to the image forming apparatus 200 in the store 470 and processes payment of a fee, the printing is performed.

In a case where printing of the Web page is performed even though link information in the Web page or the copyright of the embedded content is managed, the user may infringe the copyright. Even in a case where a Web service provider performs processing regarding copyrights for displaying the content, in the Web server 400, there is a possibility that the user 450 being a printing service provider or a printing service user infringes the copyright in a case where printing of the content is performed.

An element that needs processing regarding copyrights may be provided in not only a Web page but also a document of which the image forming apparatus 200 is to perform printing using the printing service. For example, even the document is a document created by the user 450, the document may include an element copyrighted by another person.

In the exemplary embodiment, in a case where printing of a document including an element of which the copyright is managed is performed by the printing service provided by the image processing apparatus 100, it is possible to provide a print output which reflects the will of the user 450 for each element.

In the copyright management device 410, the copyright holder of an element that needs processing regarding copyrights, the agent of the copyright holder, or the like registers the copyright of the element in advance. The copyright management device 410 issues a copyright ID for the registered element. For example, the copyright management device generates and manages an element-copyright correspondence table 700 which will be described later with reference to FIG. 7. The copyright management device may manage a right holder ID in association with the element ID and the copyright ID in addition to an association of the element ID and the copyright ID. The copyright management device manages the copyright ID and the use condition in association with each other. For example, the copyright management device generates and manages a copyright use information table 800 which will be described later with reference to FIG. 8. Here, examples of the use condition include a permitted medium (Web site link OK, electronic copy OK, printing NG, availability of a commercial use, and the like), a fee for each condition, the summary of a copyright (for example, explanation of the element, information (specifically, URL or the like) for an access to the element), and editing (for example, designation of the abstract for an abstract display, the thumbnail of an image, a displayable resolution of an image, the size of an image to perform printing, and the like) in a case where unwanted element is designated.

As an operation of the copyright management device 410, the copyright management device 410 receives the copyright ID and information of a use medium or the purpose (for example, printing and the like are provided as the purpose) and transmits a response of the above-described editing based on management information.

The Web server 400 is a general content management site. In a case of managing a Web page, the Web server 400 may check whether copyrighted content is included, transmit an inquiry to the copyright management device 410. The Web server 400 may display the Web page or perform payment processing, based on the use condition in response to the inquiry.

In a case where an electronic document such as a Web page or a PDF is provided as a document including an element that needs processing regarding copyrights, (1) a copyright ID may be embedded in a tag. In this case, the image processing apparatus 100, the image forming apparatus 200, or the user terminal 300 may transmit an inquiry to the copyright management device 410 to acquire the use condition.

(2) A link referring to copyright information may be embedded. In this case, a document provider (or copyright holder) prepares copyright information including the use condition and embeds a URL for referring to the copyright information in the document. The image processing apparatus 100, the image forming apparatus 200, or the user terminal 300 may access the URL and acquire the use condition.

A known printing service will be described.

1. A user uploads a document or an image from a terminal such as a mobile terminal or a PC to a server that performs a printing service.

In a "web page printing" function, in a case where the user designates a URL, the server acquires a web page of the URL.

For example, the server may acquire a Web page by referring to a URL. Alternatively, an application (such as a browser) of the terminal such as a mobile terminal or a PC acquires a Web page by referring to a URL and converts the Web page into a PDF or a unique printable format. Then, the application uploads the converted data from the terminal to the server that performs the printing service.

2. The server that performs the printing service issues a reservation number of printing to the terminal of the user in association with the document, the image, or the Web page, which has been uploaded.

3. The user inputs the reservation number to a printer installed in a convenience store or the like.

4. In the printing service, fee information for performing printing of a document corresponding to the reservation number is transmitted to the printer.

5. The user processes payment of the fee for performing printing, which has been displayed on a screen of the printer.

6. The printer transmits a printing request to the server that performs the printing service. Then, the printer acquires output data from the server and performs printing of the output data.

Figure 5:
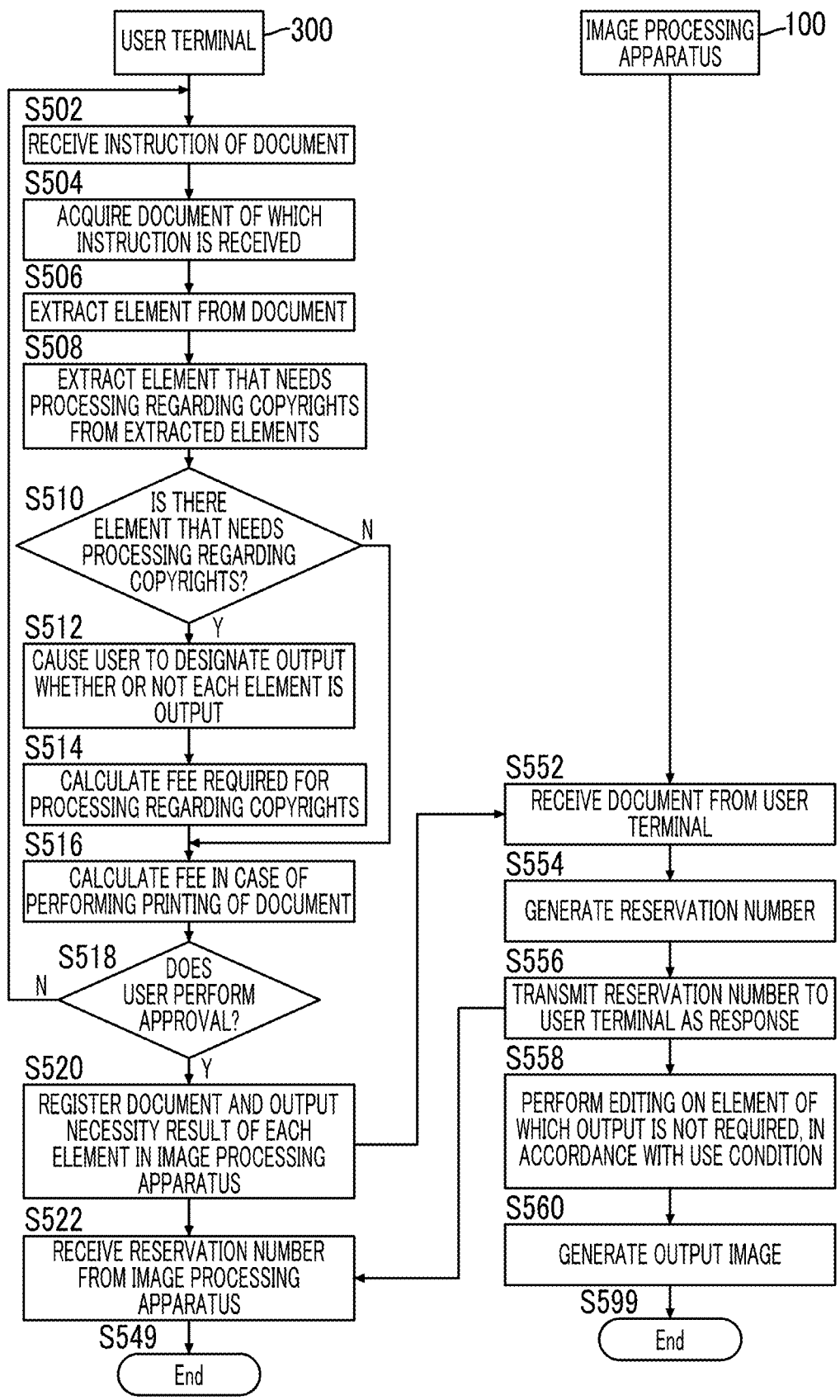
FIG. 5 is a flowchart illustrating a process example according to the exemplary embodiment.

FIG. 5 is a flowchart illustrating a process example according to the exemplary embodiment. A process example performed between the user terminal 300 and the image processing apparatus 100 in accordance with an operation of the user 450 will be described. Specifically, FIG. 5 illustrates a process example until the user terminal 300 receives a reservation number (example of information for identifying a document) from the image processing apparatus 100. In the process example, the user terminal 300 performs processing relating to a copyright.

In Step S502, the user terminal 300 receives an instruction of a document. For example, the user terminal 300 may directly designate a URL in which a document set as a target by the user 450 is stored. The user terminal 300 may search for a target document using a searching system on the Internet, or may designate a document stored in a document management system (may include the image processing apparatus 100).

In Step S504, the user terminal 300 acquires the document of which the instruction is received in Step S502. The user terminal 300 may acquire, for example, a document-element information table 600 as the attribute of the document, in addition to the document itself. FIG. 6 is a diagram illustrating a data structure example of the document-element information table 600. The document-element information table 600 has a document ID field 605, a document title field 610, a creation date field 615, a creator field 620, a number-of-elements field 625, and an element ID field 630. In the exemplary embodiment, information (specifically, document ID (abbreviation of identification)) for uniquely identifying a document is stored in the document ID field 605. A document title of the document is stored in the document title field 610. The creation date and time of the document (may be year, month, day, hour, minute, second, second or less, or a combination thereof) is stored in the creation date field 615. A creator of the document is stored in the creator field 620. The number of elements provided in the document is stored in the number-of-elements field 625. In the exemplary embodiment, information (specifically, element ID) for uniquely identifying an element is stored in the element ID field 630.

In Step S506, the user terminal 300 extracts an element from the document. The user terminal 300 may extract the element by using the document-element information table 600 or may analyze the target document and detect an element.

In Step S508, the user terminal 300 extracts an element that needs processing regarding copyrights among extracted elements. For example, the user terminal 300 may transmit an inquiry to the copyright management device 410 for each extracted element and determine whether or not the element is an element that needs processing regarding copyrights. As a result of the process in Step S508, the user terminal 300 generates, for example, an element-copyright correspondence table 700. FIG. 7 is a diagram illustrating a data structure example of the element-copyright correspondence table 700. The element-copyright correspondence table 700 has an element ID field 705 and a copyright ID field 710. An element ID is stored in the element ID field 705. In the exemplary embodiment, information (specifically, copyright ID) for uniquely identifying a copyright of the element is stored in the copyright ID field 710. That is, an element managed with the element-copyright correspondence table 700 corresponds to "the element that needs processing regarding copyrights". The element-copyright correspondence table 700 may be embedded in a document.

The user terminal acquires information required for processing regarding copyrights corresponding to the copyright ID from the copyright management device 410 and generates, for example, a copyright use information table 800.

FIG. 8 is a diagram illustrating a data structure example of the copyright use information table 800. The copyright use information table 800 has a copyright ID field 805, a copyright holder field 810, a name field 815, a size field 820, a use condition field 825, and a display condition-at-not-use-time field 840. The use condition field 825 has a use fee field 830 and an others field 835. The display condition-at-not-use-time field 840 has a edit detail field 845 and an others field 850. A copyright ID is stored in the copyright ID field 805. A copyright holder of a copyrighted matter is stored in the copyright holder field 810. The name of the copyrighted matter is stored in the name field 815. The size of the copyrighted matter is stored in the size field 820. For example, in a case where the element is image data, the number of vertical and horizontal pixels of the image is stored. In a case where the element is text data, the number of characters, the font size, data capacity, and the like are stored. The use condition of the copyrighted matter is stored in the use condition field 825. A fee for using the copyrighted matter is stored in the use fee field 830. Other conditions in a case using the copyrighted matter are stored in the others field 835. For example, information for an instruction of the copyright notation and a condition of whether or not redistribution is possible are provided. A display condition in a case of not using the copyrighted matter is stored in the display condition-at-not-use-time field 840. Details of editing the copyrighted matter are stored in the edit detail field 845. For example, the processing includes deletion of the copyrighted matter, painted black, an abstract to be displayed by replacement into the copyrighted matter in a case where the copyrighted matter is text data, and a change to a resolution which is equal to or smaller than x DPI (x indicates a predetermined value, DPI: an abbreviation of dots per inch) in a case where the copyrighted matter is image data. Other conditions in a case of not using the copyrighted matter are stored in the others field 850.

In Step S510, the user terminal 300 determines whether or not there is an element that needs processing regarding copyrights. In a case where there is the element, the process proceeds to Step S512. In other cases, the process proceeds to Step S516.

In Step S512, the user terminal 300 causes the user to designate whether or not each element is output.

In Step S514, the user terminal 300 calculates a fee required for processing regarding copyrights.

In Step S516, the user terminal 300 calculates a fee in a case of performing printing of the document.

In Step S518, the user terminal 300 determines whether or not the user performs an approval. In a case of the approval, the process proceeds to Step S520. In other cases, the process returns to Step S502.

In Step S520, the user terminal 300 registers the document, an output necessity result of each element, and information stored in the copyright use information table 800, in the image processing apparatus 100.

In Step S522, the user terminal 300 receives a reservation number from the image processing apparatus 100.

In Step S552, the image processing apparatus 100 receives the document from the user terminal 300.

In Step S554, the image processing apparatus 100 generates a reservation number. For example, the image processing apparatus generates a target document information table 900. FIG. 9 is a diagram illustrating a data structure example of the target document information table 900. The target document information table 900 has a document ID field 905, a URL field 910, a reservation number field 915, a date field 920, a user field 925, a print data field 930, a printing property field 935, an only printing fee field 940, a copyright fee field 945, a total fee field 950, a number-of-elements-to-need-processing-regarding-copyrights field 955, an element ID field 960, an edit necessity field 965, a edit detail field 970, and an element use fee field 975. A document ID is stored in the document ID field 905. A URL in which the document is stored is stored in the URL field 910. A reservation number is stored in the reservation number field 915. The date and time when the reservation number is issued is stored in the date field 920. A user (user operating the user terminal 300) who is to acquire the reservation number is stored in the user field 925. Print data is stored in the print data field 930. Printing properties are stored in the printing property field 935. Examples of the printing properties include the number of copies, monochrome/color, the paper size, and an enlargement/reduction ratio. A fee in only printing is stored in the only printing fee field 940. A use fee for performing printing of a copyrighted element is stored in the copyright fee field 945. The total fee (value obtained by adding the fee in the only printing fee field 940 and the fee in the copyright fee field 945) for performing printing of the document is stored in the total fee field 950. The number of elements to need processing regarding copyrights is stored in the number-of-elements-to-need-processing-regarding-copyrights 955. Combinations of the element ID field 960, the edit necessity field 965, the edit detail field 970, and the element use fee field 975 follow the number-of-elements-to-need-processing-regarding-copyrights 955. The number of combinations corresponds to the value in the number-of-elements-to-need-processing-regarding-copyrights 955. An element ID is stored in the element ID field 960. Whether or not the element has a need to be edited is stored in the edit necessity field 965. Edit details in a case of editing the element are stored in the edit detail field 970. A fee in a case using the element is stored in the element use fee field 975.

In Step S556, the image processing apparatus 100 transmits the reservation number to the user terminal 300 as a response.

In Step S558, the image processing apparatus 100 edits an element of which outputting is not required, in accordance with the use condition.

In Step S560, the image processing apparatus 100 generates an output image.

In a case where printing of the document is performed by the image forming apparatus 200, a fee table 1000 is generated by the image forming apparatus 200 and is transmitted to the image processing apparatus 100. FIG. 10 is a diagram illustrating a data structure example of the fee table 1000. The fee table 1000 has a print ID field 1005, a document ID field 1010, a date field 1015, a user field 1020, a total fee field 1025, an only printing fee field 1030, a number-of-used-elements field 1035, an element ID field 1040, and a use fee field 1045. In the exemplary embodiment, information (specifically, print ID) for uniquely identifying printing is stored in the print ID field 1005. A document ID of a document of which printing is performed with the print ID is stored in the document ID field 1010. The date and time when the printing is performed is stored in the date field 1015. A user who has performed an instruction of the printing is stored in the user field 1020. The total fee of the use fee for the printing is stored in the total fee field 1025. A fee in only printing is stored in the only printing fee field 1030. The number of used elements is stored in the number-of-used-elements field 1035. Combinations of the element ID field 1040 and the use fee field 1045 follow the number-of-used-elements field 1035. The number of combinations corresponds to the number of elements, which has been described in the number-of-used-elements field 1035. An element ID is stored in the element ID field 1040. A use fee of the element is stored in the use fee field 1045.

Figure 11:
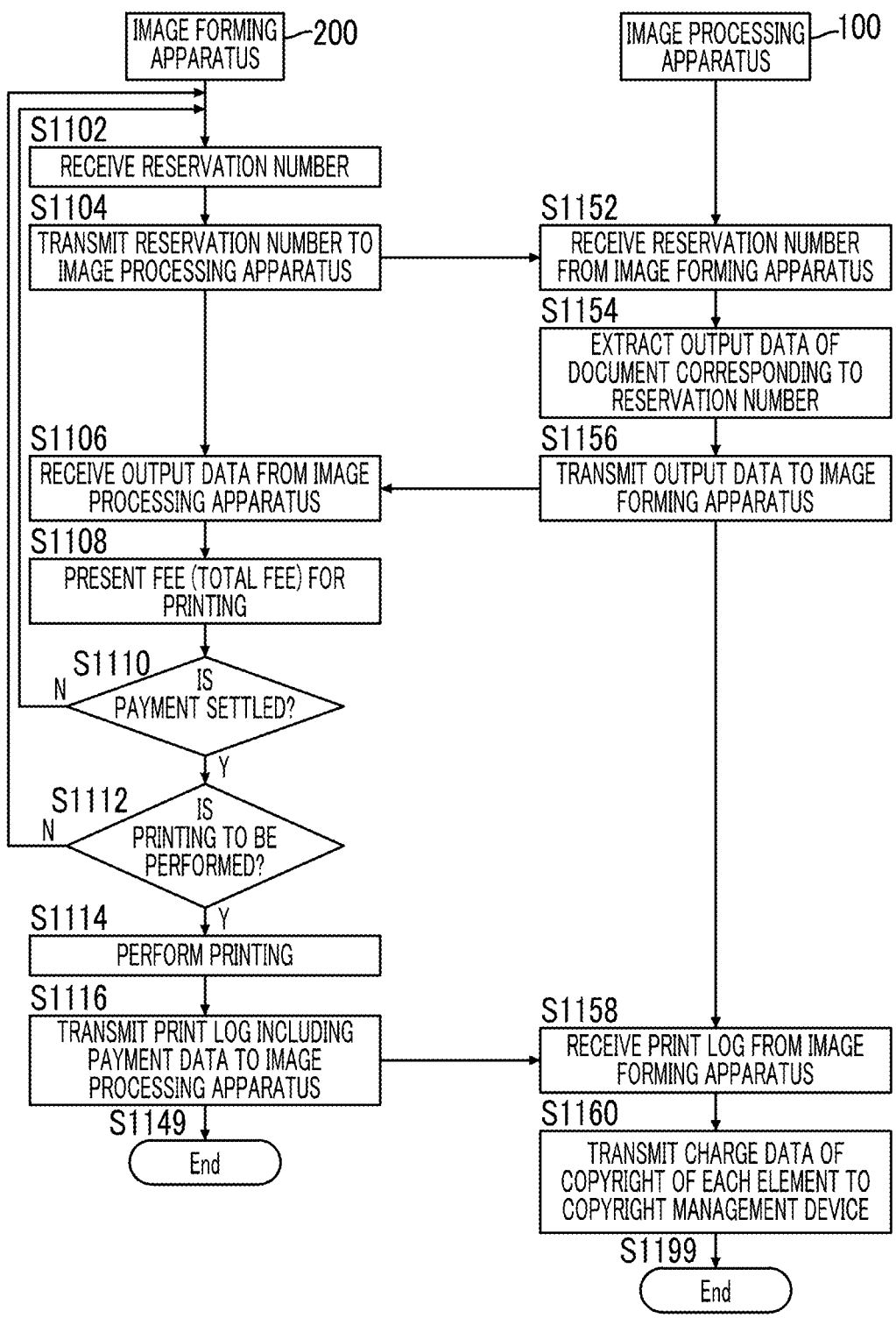
FIG. 11 is a flowchart illustrating a process example according to the exemplary embodiment.

FIG. 11 is a flowchart illustrating a process example according to the exemplary embodiment. A process example performed between the image forming apparatus 200 and the image processing apparatus 100 in accordance with an operation of the user 450 will be described. Specifically, FIG. 11 illustrates a process example in which the image forming apparatus 200 receives a reservation number (example of information for identifying a document) by an operation of the user, receives output data corresponding to the reservation number from the image processing apparatus 100, and then performs printing.

In Step S1102, the image forming apparatus 200 receives a reservation number by an operation of the user.

In Step S1104, the image forming apparatus 200 transmits the reservation number to the image processing apparatus 100.

In Step S1152, the image processing apparatus 100 receives the reservation number from the image forming apparatus 200.

In Step S1154, the image processing apparatus 100 extracts output data of a document corresponding to the reservation number.

In Step S1156, the image processing apparatus 100 transmits the output data to the image forming apparatus 200.

In Step S1106, the image forming apparatus 200 receives output data from the image processing apparatus 100.

In Step S1108, the image forming apparatus 200 presents a fee (total fee) for printing.

In Step S1110, the image forming apparatus 200 determines whether or not payment of the fee is settled. In a case of being settled, the process proceeds to Step S1112. In other cases, the process returns to Step S1102.

In Step S1112, the image forming apparatus 200 determines whether or not to perform printing in accordance with an operation of the user. In a case of performing printing, the process proceeds to Step S1114. In other cases, the process returns to Step S1102.

In Step S1114, the image forming apparatus 200 performs printing.

In Step S1116, the image forming apparatus 200 transmits a print log including payment data to the image processing apparatus 100. For example, the image forming apparatus 200 transmits the above-described fee table 1000 to the image processing apparatus 100.

In Step S1158, the image processing apparatus 100 receives the print log from the image forming apparatus 200.

In Step S1160, the image processing apparatus 100 transmits charge data of a copyright of each element to the copyright management device 410.

Figure 12:
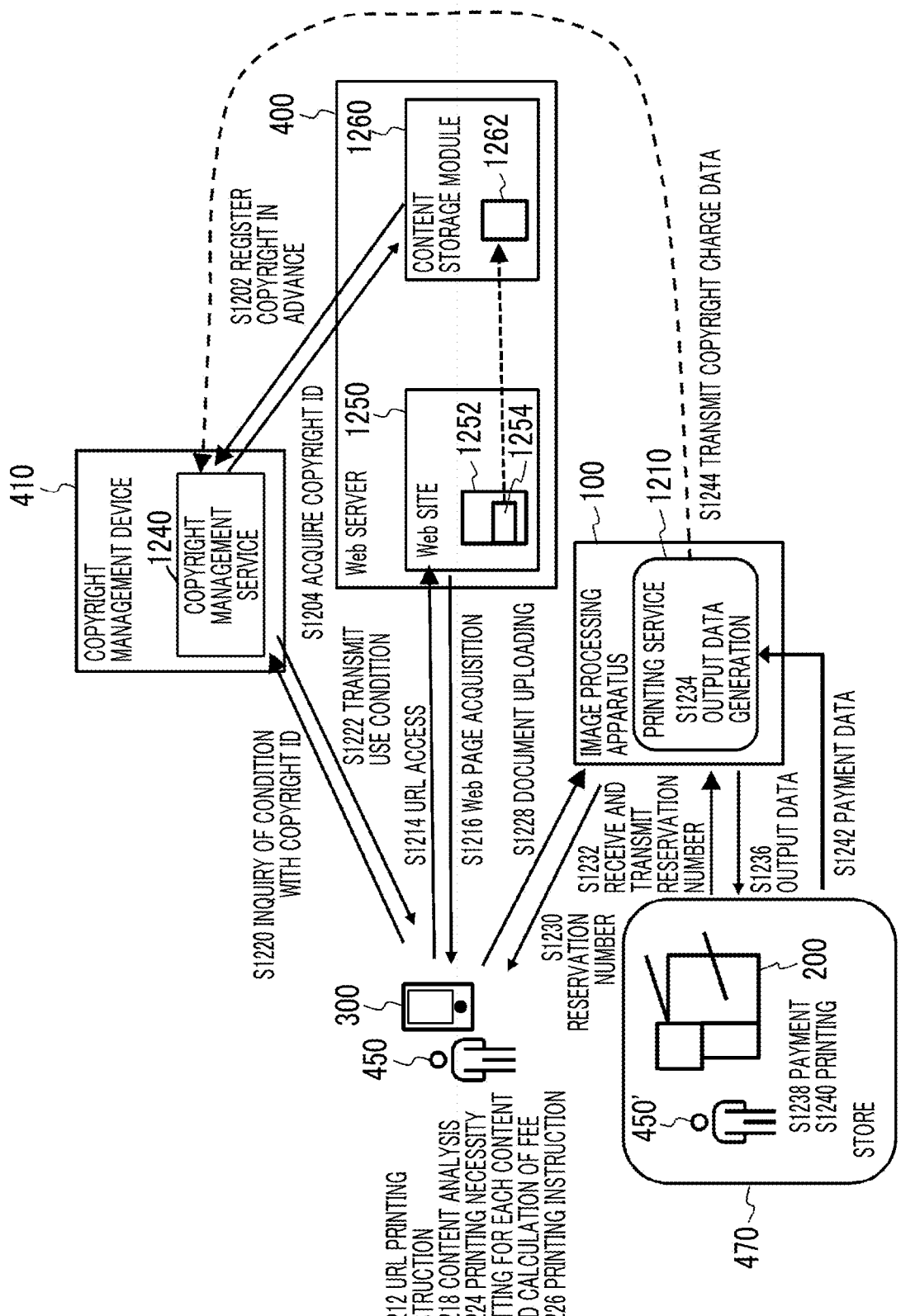
FIG. 12 is a diagram illustrating a process example according to the exemplary embodiment.

FIG. 12 is a diagram illustrating a process example according to the exemplary embodiment.

As preprocessing, Step S1202 and Step S1204 are performed.

In Step S1202, the Web server 400 causes the copyright management device 410 to register a copyright of an original content 1262 in advance.

In Step S1204, the Web server 400 acquires a copyright ID from the copyright management device 410.

A Web page 1252 is provided in a Web site 1250, and a content 1254 is provided in the Web page 1252. The content 1254 is linked to the original content 1262 in a content storage module 1260. That is, in a case of performing printing of the Web page 1252, the original content 1262 to need processing regarding copyrights is included.

As processing of making a reservation for printing, processes from Step S1212 to Step S1230 are performed.

In Step S1212, the user terminal 300 performs a URL printing instruction in accordance with an operation of the user 450.

In Step S1214, the user terminal 300 accesses a URL (Web server 400).

In Step S1216, the user terminal 300 acquires a Web page from the Web server 400.

In Step S1218, the user terminal 300 analyzes a content being an element in the document.

In Step S1220, the user terminal 300 transmits an inquiry of a use condition of a copyrighted matter with the copyright ID to the copyright management device 410.

In Step S1222, the copyright management device 410 transmits the use condition to the user terminal 300.

In Step S1224, the user terminal 300 sets whether or not printing is required, for each content in accordance with an operation of the user 450 and calculates a fee.

In Step S1226, the user terminal 300 receives an instruction to perform printing, in accordance with an operation of the user 450.

In Step S1228, the user terminal 300 uploads a document as a printing target to the image processing apparatus 100.

In Step S1230, the image processing apparatus 100 transmits a reservation number to the user terminal 300.

As printing in the image forming apparatus 200, processes from Step S1232 to Step S1244 are performed. The user 450 enters into the store 470 and operates the image forming apparatus 200.

In Step S1232, the image forming apparatus 200 receives a reservation number by an operation of the user 450' and transmits the reservation number to the image processing apparatus 100.

In Step S1234, in a printing service 1210 in the image processing apparatus 100, output data of a document corresponding to the reservation number is generated.

In Step S1236, the image processing apparatus 100 transmits the output data to the image forming apparatus 200. The image forming apparatus 200 receives the output data.

In Step S1238, the image forming apparatus 200 performs payment by the user 450'.

In Step S1240, the image forming apparatus 200 performs printing of a target document (output data received in Step S1236).

In Step S1242, the image forming apparatus 200 transmits payment data to the image processing apparatus 100. For example, the image forming apparatus transmits the fee table 1000.

In Step S1244, the image processing apparatus 100 transmits copyright charge data to the copyright management device 410. For example, the image processing apparatus transmits paid charge data of each element (specifically, combination of the element ID field 1040 and the use fee field 1045 in the fee table 1000).

Figure 13C:
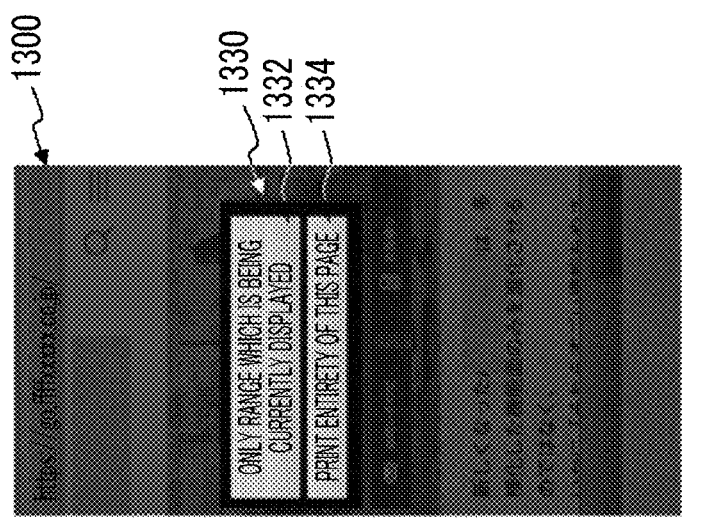
FIGS. 13A to 13C are diagrams illustrating a process example according to the exemplary embodiment.
Figure 13B:
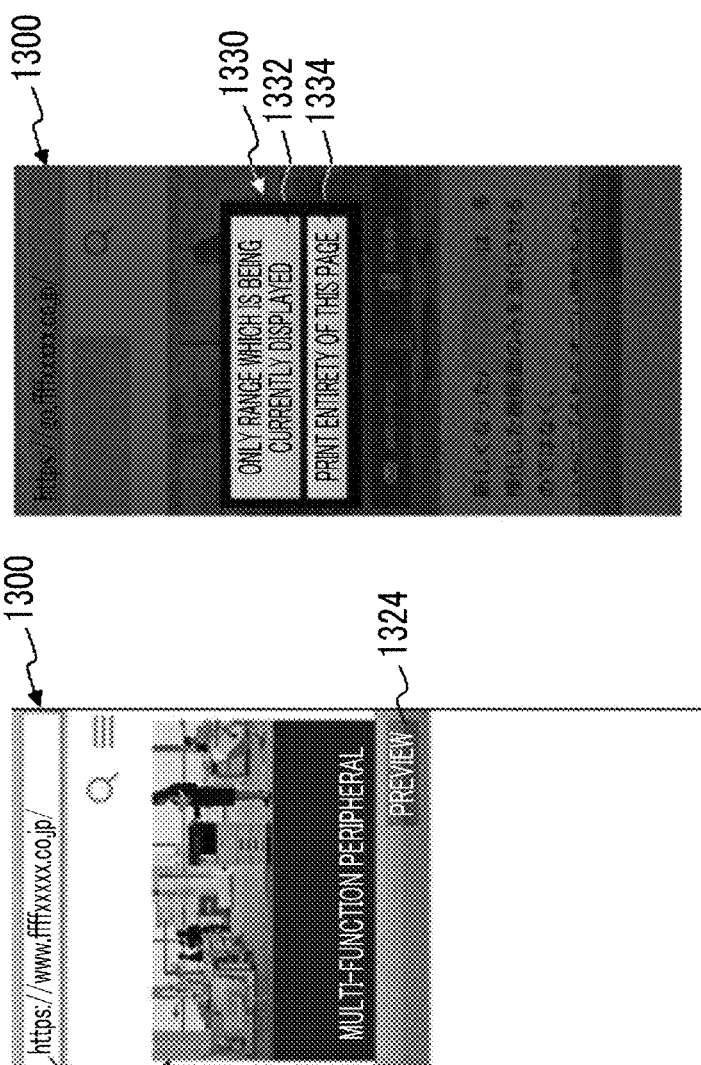
Figure 13A:
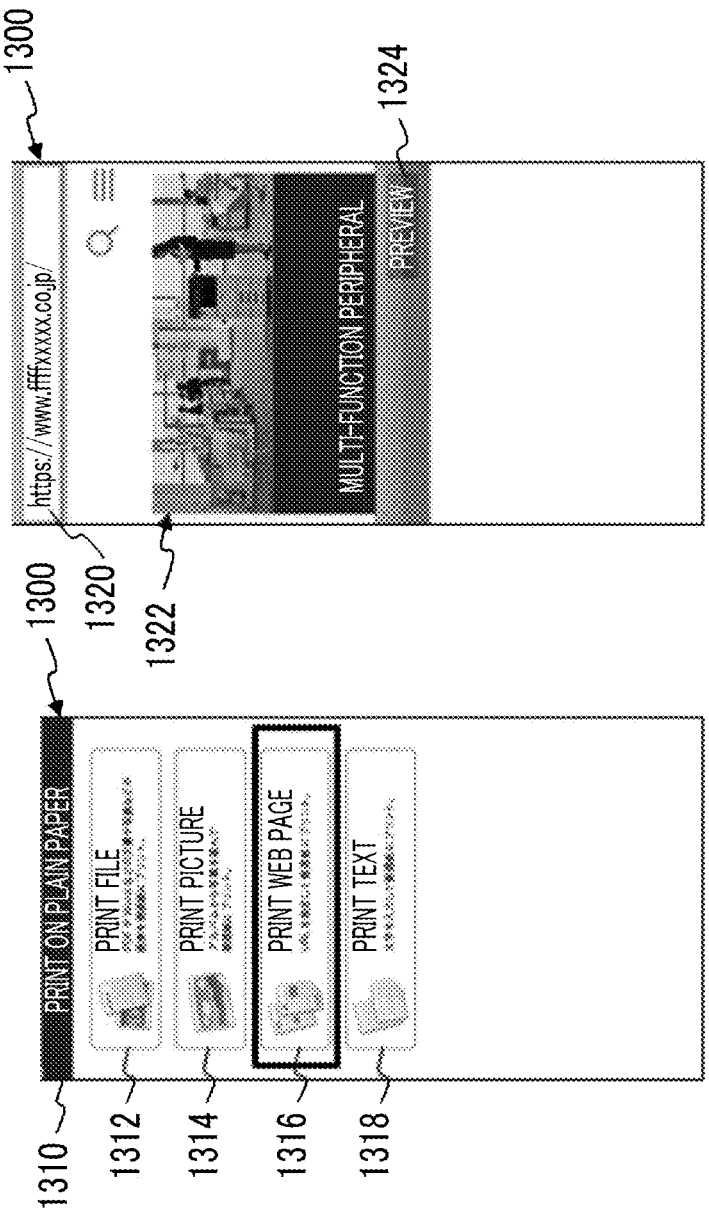

FIGS. 13A to 13C are diagrams illustrating a process example according to the exemplary embodiment. For example, FIGS. 13A to 13C illustrate an example in a case where the user 450 activates an application for causing the user terminal 300 to perform printing.

FIGS. 13A to 13C illustrate the process example of Step S1212 illustrated in the example of FIG. 12 and illustrate a display example on a screen 1300 of the user terminal 300.

FIG. 13A illustrates an example of an initial screen in the printing service.

A comment display region 1310, a "print a file" button 1312, a "print a picture" button 1314, a "print a web page" button 1316, and a "print a text" button 1318 are displayed on the screen 1300.

In a case where the "print a web page" button 1316 is selected in accordance with an operation of the user 450, the display example illustrated in FIG. 13B is made.

FIG. 13B illustrates an example in which a URL is designated by an operation of the user 450, and a Web page as a printing target is displayed.

A URL designation region 1320, a preview region 1322, and a preview button 1324 are displayed on the screen 1300. A URL is input into the URL designation region 1320 by an operation of the user 450. A Web page of the URL is displayed in the preview region 1322.

In a case where the preview button 1324 is selected by an operation of the user 450, the display example illustrated in FIG. 13C is made.

In FIG. 13C, a preview of the Web page as a printing target is displayed. A printing range setting region 1330 is displayed on the screen 1300. In the printing range setting region 1330, an "only range which is being currently displayed" button 1332 and a "print entirety of this page" button 1334 are provided.

In a case where the "print entirety of this page" button 1334 is selected by an operation of the user 450, the display example illustrated in FIG. 14A1 is made. On the screen 1300, for example, a reduced image (first page) 1410, a reduced image (second page) 1412, a reduced image (third-page) 1414, a reduced image (fourth page) 1416, a reduced image (fifth page) 1418, a reduced image (sixth page) 1420, a return button 1422, and a transmit button 1424 are displayed.

Here, the preview screen shows that the printing target is 13 pages, and an element (copyrighted image 1430) to need processing regarding copyrights is included in the fourth page. For example, the copyrighted image 1430 is surrounded by a red frame in order to indicate that the image is an element that needs processing regarding copyrights. In addition to the display example of being surrounded by a red frame, a display indicating that the element is different from other elements (elements that do not need processing regarding copyrights) may be performed, for example, the element may be surrounded by a bold frame, or may be caused to blink.

As illustrated in the example of FIG. 14A2, an inquiry of whether or not the copyrighted image 1430 is set to a printing target may be transmitted to the user 450.

A copyright use comment display region 1440 is displayed on the preview screen of the screen 1300. An OK button 1442 and a NO button 1444 are displayed in the copyright use comment display region 1440.

Regarding the copyrighted image 1430, the user 450 may set "print with charge" by selecting the OK button 1442, and may set "not print" by selecting the NO button 1444.

In the example of FIG. 14A1 or 14A2, in a case where the transmit button 1424 is selected by the user 450, the screen transitions to the display example in FIG. 14B.

In the example of FIG. 14B, a comment display region 1450 and an upload button 1459 are displayed on the screen 1300. A paper size display region 1452, a color mode display region 1454, a reservation number type display region 1456, a PIN display region 1458, and the like are displayed in the comment display region 1450. A paper size, a color mode (designation of color printing or monochrome printing), a reservation number type (alphanumeric characters, only English characters, and the like), a PIN and the like for using the printing service, and the like may be set in printing.

In a case where the upload button 1459 is selected by the user 450, the user terminal 300 acquires Web page data of the URL, converts the acquired Web page data into a PDF or print data, and uploads the converted data to the image processing apparatus 100. Alternatively, the user terminal 300 may only transmit the URL to the image processing apparatus 100, and the image processing apparatus 100 may acquire the Web page data of the URL and convert the Web page data to a PDF or print data.

In a case where the upload button 1459 is selected by an operation of the user 450, the display example illustrated in FIG. 14C is made.

A comment display region 1460 and a reserved print display region 1462 are displayed on the screen 1300. FIG. 14C illustrates an example of a screen in which a reservation number is issued.

For example, "printing reservation number: 3FDXQ34H, printing expiration date: 2019/01/23 23:59:59, file name: document_AAA" is displayed in the reserved print display region 1462.

Figure 15:
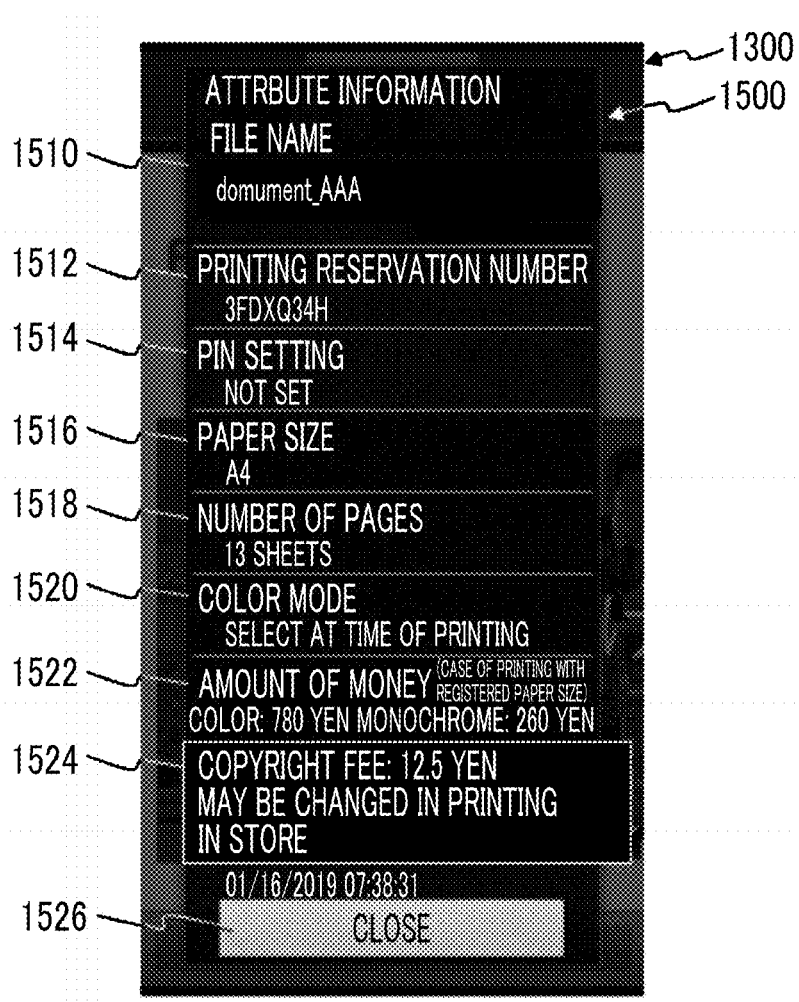
FIG. 15 is a diagram illustrating a process example according to the exemplary embodiment.

FIG. 15 is a diagram illustrating a process example according to the exemplary embodiment.

A printing property display region 1500 and a close button 1526 are displayed on the screen 1300. A file name display region 1510, a printing reservation number display region 1512, a PIN setting display region 1514, a paper size display region 1516, a number-of-pages display region 1518, a color mode display region 1520, an amount-of-money display region 1522, and a copyright fee display region 1524 are displayed in the printing property display region 1500.

The amount of money for printing may be displayed. In particular, a use fee in a case of performing printing of an element that needs processing regarding copyrights is displayed in the copyright fee display region 1524. For example, a sentence that "copyright fee 12.5 yen, may be changed in printing in the store" is displayed. The copyright fee display region 1524 may be surrounded by a red frame. In addition to the display example of being surrounded by a red frame, a display indicating that the fee is for the copyright may be performed, for example, the region may be surrounded by a bold frame, or may be caused to blink.

Figure 16:
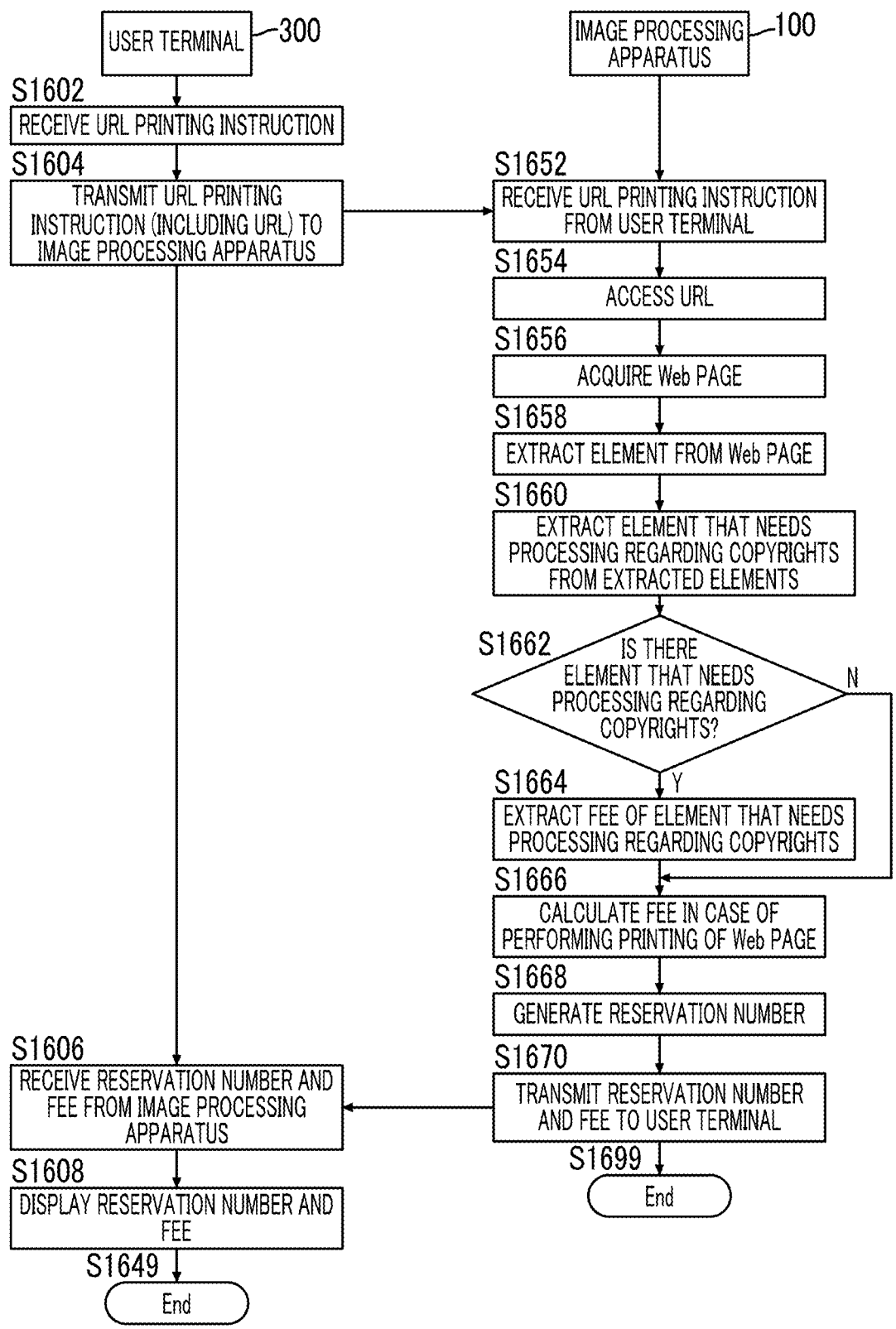
FIG. 16 is a flowchart illustrating a process example according to the exemplary embodiment.

FIG. 16 is a flowchart illustrating a process example according to the exemplary embodiment. A process example performed between the user terminal 300 and the image processing apparatus 100 in accordance with an operation of the user 450 will be described. Specifically, FIG. 5 illustrates a process example until the user terminal 300 receives a reservation number (example of information for identifying a document) from the image processing apparatus 100. In the process example, the image processing apparatus 100 performs processing relating to a copyright.

In Step S1602, the user terminal 300 receives a URL printing instruction by an operation of the user 450.

In Step S1604, the user terminal 300 transmits the URL printing instruction (including a URL) to the image processing apparatus 100.

In Step S1652, the image processing apparatus 100 receives the URL printing instruction from the user terminal 300.

In Step S1654, the image processing apparatus 100 accesses the URL.

In Step S1656, the image processing apparatus 100 acquires a Web page.

In Step S1658, the image processing apparatus 100 extracts an element from the Web page.

In Step S1660, the image processing apparatus 100 extracts an element that needs processing regarding copyrights among extracted elements.

In Step S1662, the image processing apparatus 100 determines whether or not there is an element that needs processing regarding copyrights. In a case where there is the element, the process proceeds to Step S1664. In other cases, the process proceeds to Step S1666.

In Step S1664, the image processing apparatus 100 extracts a fee of the element that needs processing regarding copyrights.

In Step S1666, the image processing apparatus 100 calculates a fee in a case of performing printing of the Web page.

In Step S1668, the image processing apparatus 100 generates a reservation number.

In Step S1670, the image processing apparatus 100 transmits the reservation number and the fee to the user terminal 300.

In Step S1606, the user terminal 300 receives the reservation number and the fee from the image processing apparatus 100.

In Step S1608, the user terminal 300 displays the reservation number and the fee for the user 450.

Figure 17A:
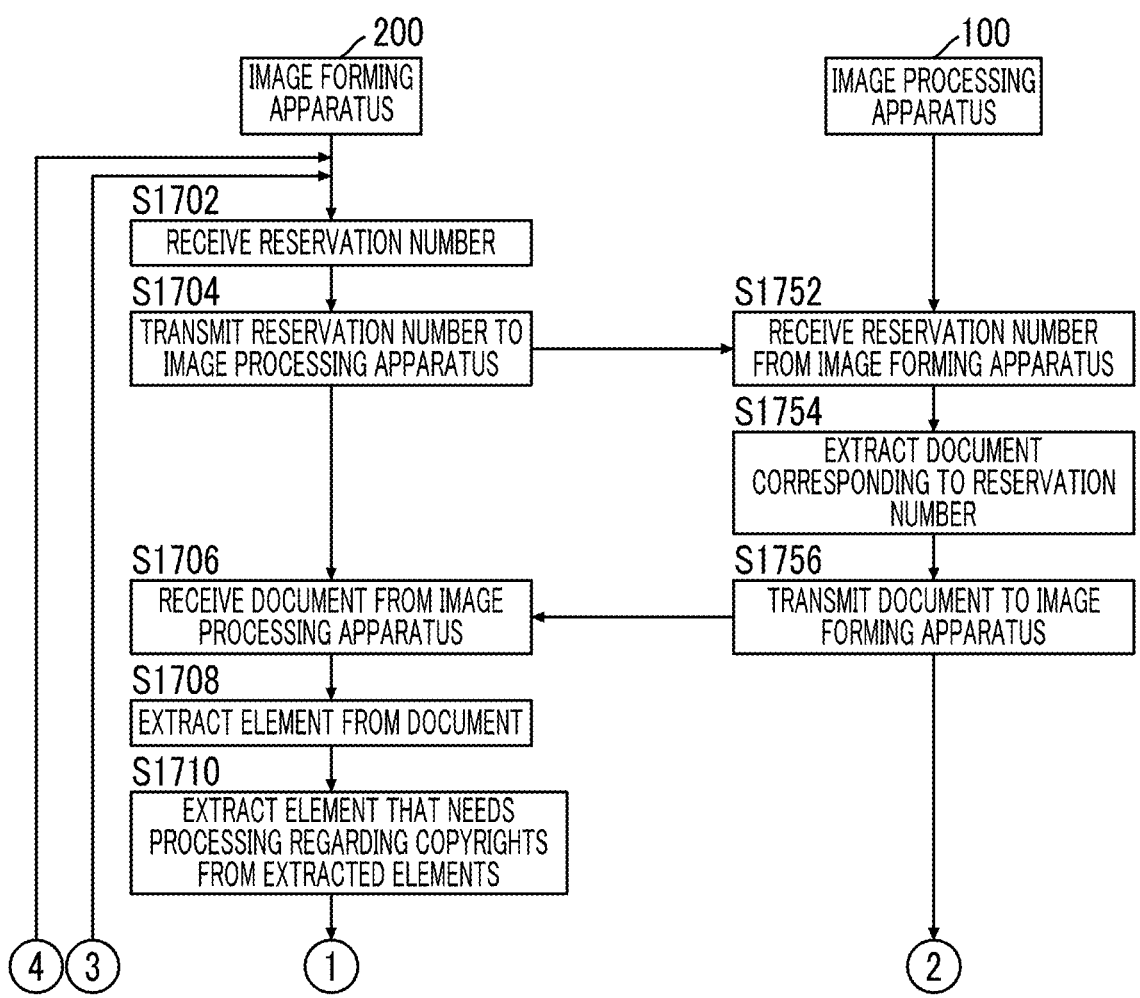
FIG. 17A is a flowchart illustrating a process example according to the exemplary embodiment.
Figure 17B:
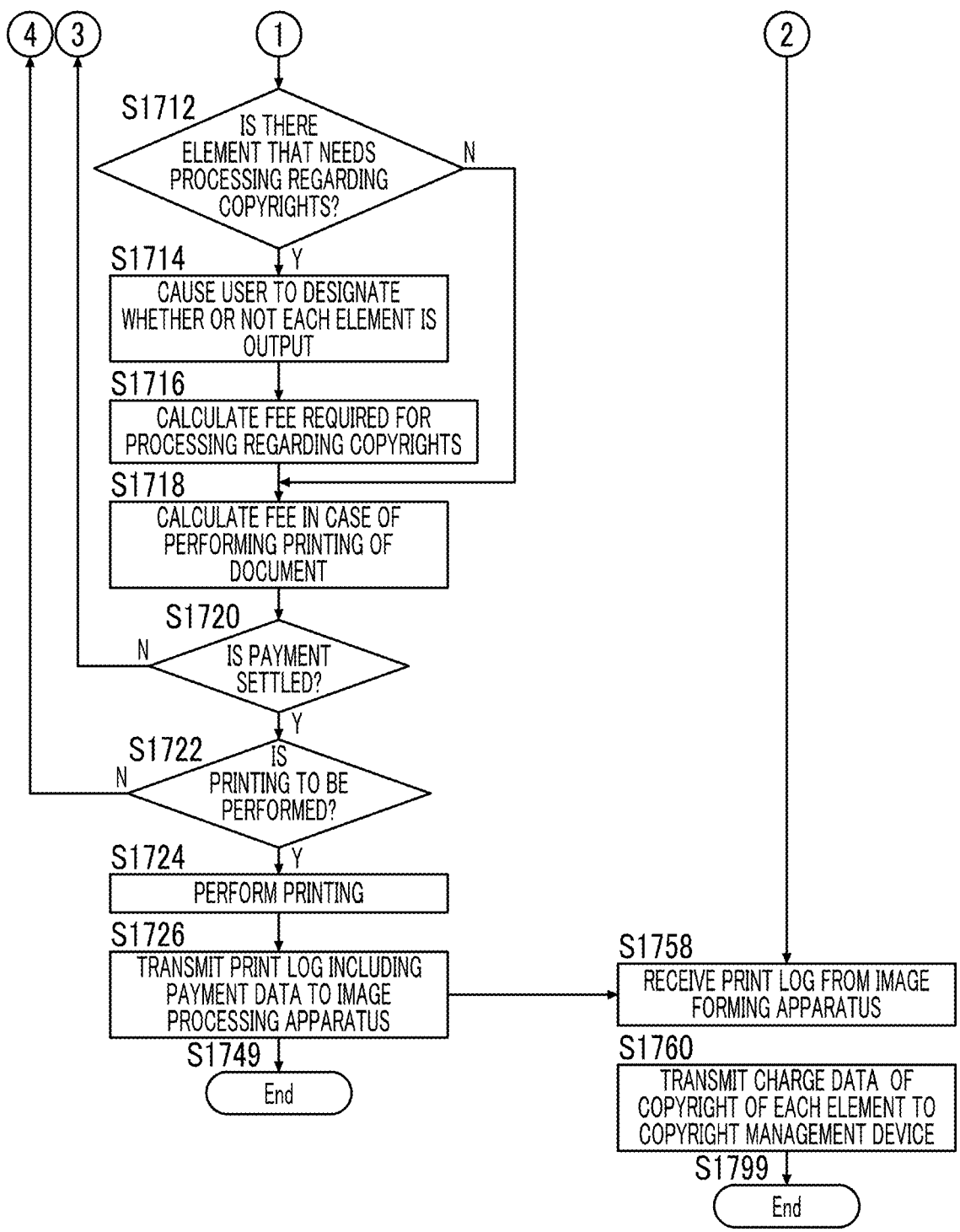
FIG. 17B is a flowchart illustrating a process example according to the exemplary embodiment.

FIGS. 17A and 17B are flowcharts illustrating a process example according to the exemplary embodiment. A process example performed between the image forming apparatus 200 and the image processing apparatus 100 in accordance with an operation of the user 450 will be described. Specifically, FIG. 11 illustrates a process example in which the image forming apparatus 200 receives a reservation number (example of information for identifying a document) by an operation of the user, receives output data corresponding to the reservation number from the image processing apparatus 100, and then performs printing. In the process example, the image forming apparatus 200 performs processing relating to a copyright.

In Step S1702, the image forming apparatus 200 receives a reservation number by an operation of the user.

In Step S1704, the image forming apparatus 200 transmits the reservation number to the image processing apparatus 100.

In Step S1752, the image processing apparatus 100 receives the reservation number from the image forming apparatus 200.

In Step S1754, the image processing apparatus 100 extracts a document corresponding to the reservation number.

In Step S1756, the image processing apparatus 100 transmits the document to the image forming apparatus 200.

In Step S1706, the image forming apparatus 200 receives the document from the image processing apparatus 100.

In Step S1708, the image forming apparatus 200 extracts an element from the document.

In Step S1710, the image forming apparatus 200 extracts an element that needs processing regarding copyrights among extracted elements.

In Step S1712, the image forming apparatus 200 determines whether or not there is an element that needs processing regarding copyrights. In a case where there is the element, the process proceeds to Step S1714. In other cases, the process proceeds to Step S1718.

In Step S1714, the image forming apparatus 200 causes the user to designate whether or not each element is output.

In Step S1716, the image forming apparatus 200 calculates a fee required for processing regarding copyrights.

In Step S1718, the image forming apparatus 200 calculates a fee in a case of performing printing of the document.

In Step S1720, the image forming apparatus 200 determines whether or not payment is settled. In a case of being settled, the process proceeds to Step S1722. In other cases, the process returns to Step Step S1702.

In Step S1722, the image forming apparatus 200 determines whether or not to perform printing. In a case of performing printing, the process proceeds to Step S1724. In other cases, the process returns to Step S1702.

In Step S1724, the image forming apparatus 200 performs editing in accordance with whether or not an output of each designated element is required, generates output data, and then performs printing.

In Step S1726, the image forming apparatus 200 transmits a print log including payment data to the image processing apparatus 100.

In Step S1758, the image processing apparatus 100 receives the print log from the image forming apparatus 200.

In Step S1760, the image processing apparatus 100 transmits charge data of a copyright of each element to the copyright management device 410.

Figure 18:
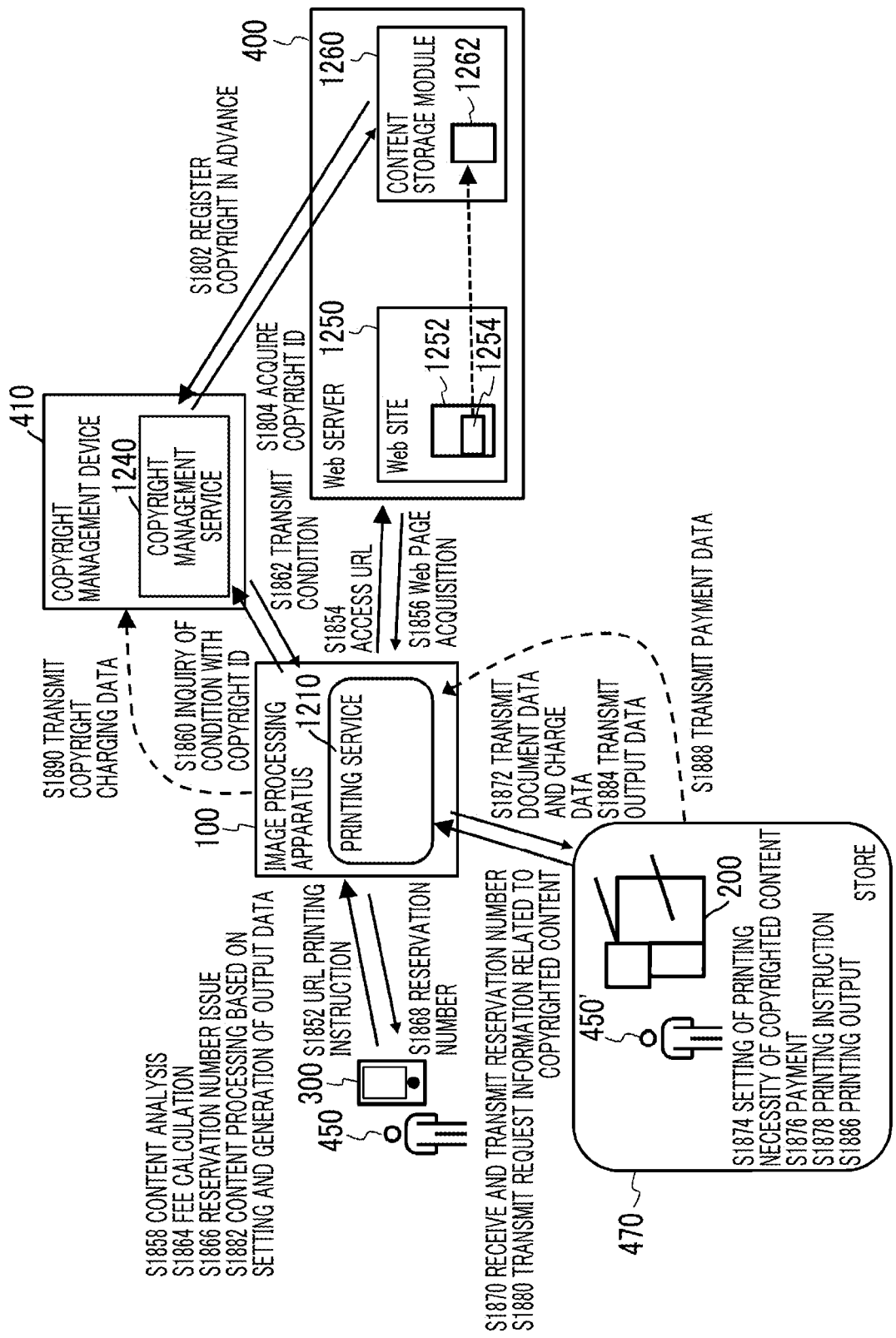
FIG. 18 is a diagram illustrating a process example according to the exemplary embodiment.

FIG. 18 is a diagram illustrating a process example according to the exemplary embodiment.

As preprocessing, Step S1802 and Step S1804 are performed.

In Step S1802, the content storage module 1260 in the Web server 400 causes the copyright management device 410 to register a copyright of an original content 1262 in advance.

In Step S1804, the content storage module 1260 in the Web server 400 acquires a copyright ID from the copyright management device 410.

As processing of making a reservation for printing, processes from Step S1852 to Step S1868 are performed.

In Step S1852, the user terminal 300 instructs the image processing apparatus 100 to perform URL printing in accordance with an operation of the user 450.

In Step S1854, the image processing apparatus 100 accesses a URL (Web server 400).

In Step S1856, the image processing apparatus 100 acquires a Web page from the Web server 400.

In Step S1858, the image processing apparatus 100 analyzes a content being an element from the Web page.

In Step S1860, the image processing apparatus 100 transmits an inquiry a use condition of a copyrighted matter with the copyright ID to the copyright management device 410.

In Step S1862, the copyright management device 410 transmits the use condition to the image processing apparatus 100.

In Step S1864, the image processing apparatus 100 calculates a fee for performing printing of a target Web page.

In Step S1866, the image processing apparatus 100 issues a reservation number for performing printing of a target Web page.

In Step S1868, the image processing apparatus 100 transmits a reservation number to the user terminal 300.

As printing in the image forming apparatus 200, processes from Step S1870 to Step S1888 are performed. The user 450 enters into the store 470 and operates the image forming apparatus 200.

In Step S1870, the image forming apparatus 200 receives a reservation number by an operation of the user 450' and transmits the reservation number to the image processing apparatus 100.

In Step S1872, the image forming apparatus 200 transmits document data and charge data to the image processing apparatus 100.

In Step S1874, the image forming apparatus 200 sets whether or not printing is required, for each content being an element that needs processing regarding copyrights, in accordance with an operation of the user 450'.

In Step S1876, the image forming apparatus 200 performs payment by the user 450'.

In Step S1878, the image forming apparatus 200 receives an instruction to perform printing by an operation of the user 450'.

In Step S1880, the image forming apparatus 200 transmits necessity information related to a copyrighted content to the image processing apparatus 100.

In Step S1882, the image processing apparatus 100 processes the content being the element that needs processing regarding copyrights based on the setting, and generates output data.

In Step S1884, the image processing apparatus 100 transmits the output data to the image forming apparatus 200. The image forming apparatus 200 receives the output data.

In Step S1886, the image forming apparatus 200 performs printing of a target document (output data received in Step S1884).

In Step S1888, the image forming apparatus 200 transmits payment data to the image processing apparatus 100.

In Step S1890, the image processing apparatus 100 transmits copyright charge data to the copyright management device 410. For example, the image processing apparatus transmits paid charge data of each element (specifically, combination of the element ID field 1040 and the use fee field 1045 in the fee table 1000).

Figure 19:
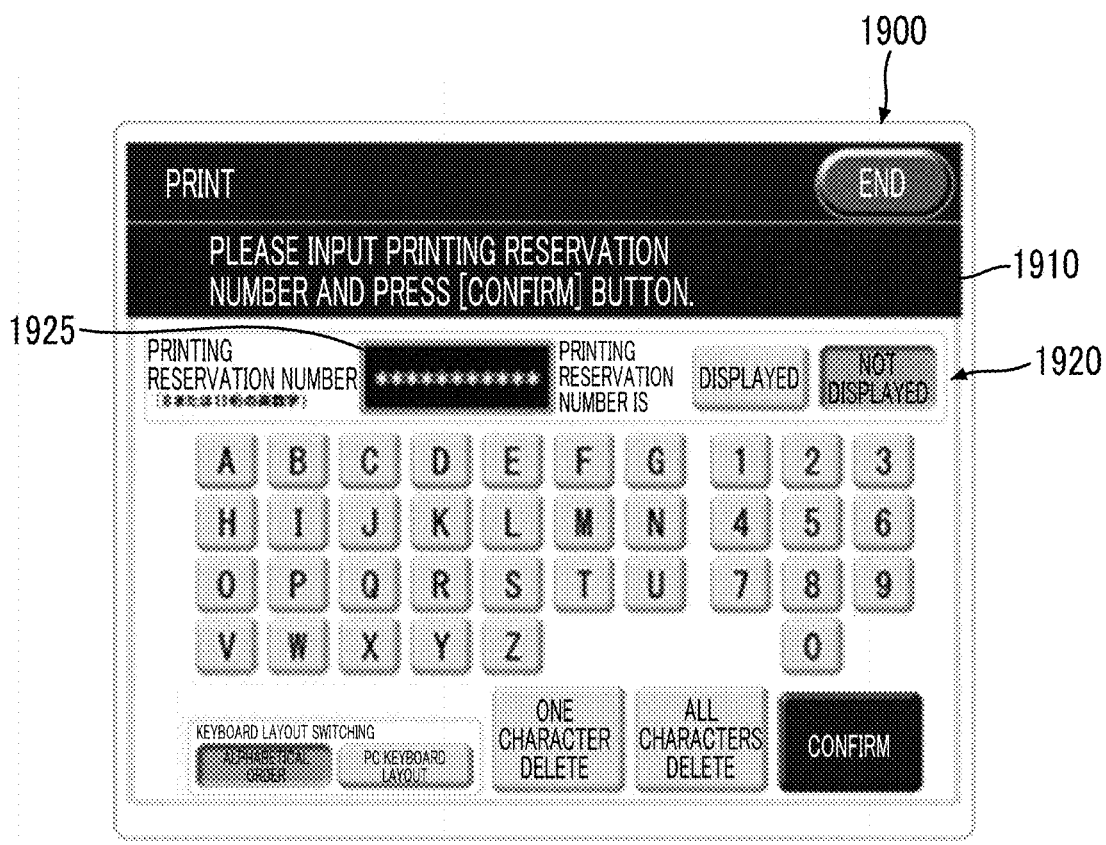
FIG. 19 is a diagram illustrating a process example according to the exemplary embodiment.

FIG. 19 is a diagram illustrating a process example according to the exemplary embodiment. FIG. 19 illustrates a process example in which the reservation number is received in Step S1870 illustrated in the example of FIG. 18.

Information displayed on an operation screen of the image forming apparatus 200 may be generated by a Web server of the image processing apparatus 100 as screen information of an HTML format, and may be displayed by a Web browser on the operation screen of the image forming apparatus 200. The user 450' may perform an input of a reservation number, setting of printing, setting of whether or not outputting of an element managed with a copyright is required, an input of payment information, and the like, using the operation screen of the image forming apparatus 200. The image processing apparatus 100 may transmit document data, charge data, or information of the target document information table 900 to the image forming apparatus 200, generate a setting screen which will be described below on the image forming apparatus 200 side, and cause the user 450' to operate.

A comment display region 1910 and a reservation number region 1920 are displayed on a screen 1900 of the image forming apparatus 200. A reservation number receiving region 1925 is displayed in the reservation number region 1920.

For example, a sentence that "please input a printing reservation number and press [confirm] button" is displayed in the comment display region 1910.

The user 450' inputs "the reservation number" into the reservation number receiving region 1925. For example, the user 450' inputs an 8-digit printing reservation number on the touch panel in accordance with a guidance of the comment display region 1910. Downloading of output data of a document of which printing is reserved in Step S1852 and the like illustrated in the example of FIG. 18 starts by inputting the reservation number.

Figure 20:
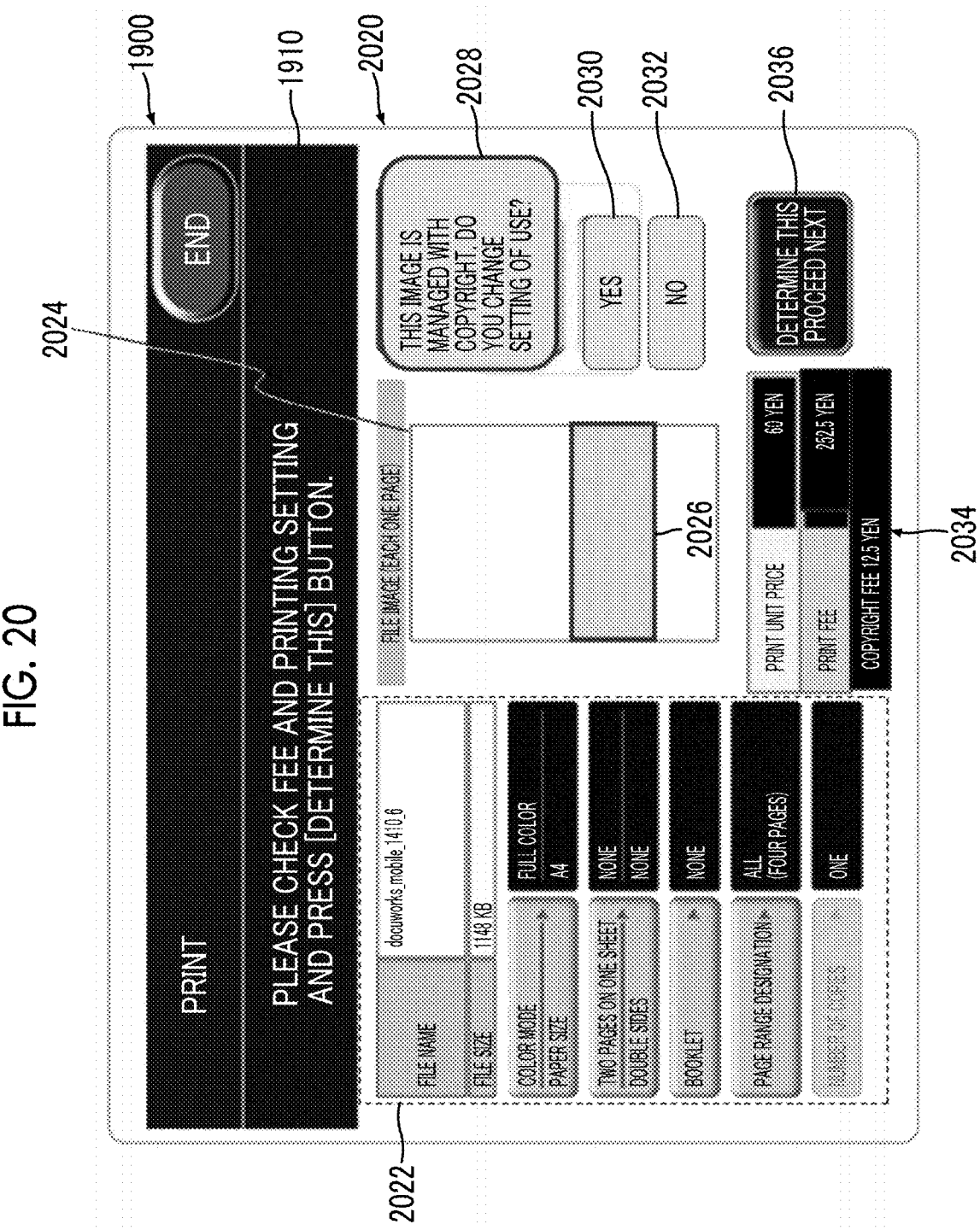
FIG. 20 is a diagram illustrating a process example according to the exemplary embodiment.

FIG. 20 is a diagram illustrating a process example according to the exemplary embodiment. As illustrated in the example of FIG. 19, FIG. 20 illustrates a display example in a case where the reservation number is input.

A comment display region 1910 and a printing property-and-like display-setting region 2020 are displayed on the screen 1900 of the image forming apparatus 200.

A printing property display-setting region 2022, a reduced image display region 2024, a processing regarding copyrights needed content 2026, a processing regarding copyrights comment display region 2028, a "Yes" button 2030, a "No" button 2032, a use fee display region 2034, and a "determine this and proceed next" button 2036 are displayed in the printing property-and-like display-setting region 2020.

For example, a sentence that "please check fee and printing setting and press [determine this] button" is displayed in the comment display region 1910.

For example, a sentence that "this image is managed with a copyright. Do you change setting of use?" is displayed in the processing regarding copyrights comment display region 2028. A point that the document as a printing target includes an image being an element that needs processing regarding copyrights is displayed.

In the reduced image display region 2024, the processing regarding copyrights needed content 2026 is displayed on the preview screen of the document to be superimposed thereon. The processing regarding copyrights needed content indicates that a content protected by the copyright is included.

The "Yes" button 2030 and the "No" button 2032 for indicating whether or not the processing regarding copyrights needed content 2026 in the reduced image display region 2024 is set as the printing target are displayed. In a case where the "Yes" button 2030 is selected by the user 450', a screen (display example illustrated in FIG. 21) for setting whether or not printing of an element that needs processing regarding copyrights is possible is displayed.

In the use fee display region 2034, for example, "print unit price is 60 yen" is displayed in the first line. "Printing fee (total fee) is 252.5 yen" is displayed in the second line. "Copyright fee in the total fee is 12.5 yen" is displayed in the third line. Here, the copyright fee corresponds to the total fee of a fee of a part at which a printing instruction of an element managed with a copyright is performed.

FIG. 21 is a diagram illustrating a process example according to the exemplary embodiment.

A comment display region 1910, a reduced image display region 2124, a previous page button 2127, a next page button 2128, a copyright information display region 2130, a use fee display region 2140, and a printing instruction region 2150 are displayed on the screen 1900 of the image forming apparatus 200.

A preview display of a document to perform printing is performed in the reduced image display region 2124 such that it is possible to refer to a portion of the page, which is the content to need processing regarding copyrights. For example, in the reduced image display region 2124, the processing regarding copyrights needed content 2126 is surrounded by a red frame, and the inside of the red frame is set to be light red. Other display forms may be used as a display form for indicating that the content needs processing regarding copyrights.

In this example, it is possible to set whether or not to pay a fee in a page unit or a content unit.

Copyright information is displayed in the copyright information display region 2130 in order to determine whether to pay a fee.

In the use fee display region 2140, for example, "printing fee is 252.5 yen" is displayed in the first line, and. "Copyright fee in the printing fee is 12.5 yen" is displayed in the second line. Here, the copyright fee corresponds to the total fee of a fee of a part at which a printing instruction of an element managed with a copyright is performed.

In the printing instruction region 2150, for example, "do you want to print this content?" is displayed, and a Yes button 2152 and a No button 2154 are displayed together. That is, the region is an example of a user interface that receives a "designation of wanted and unwanted elements that need processing regarding copyrights".

Figure 22C:
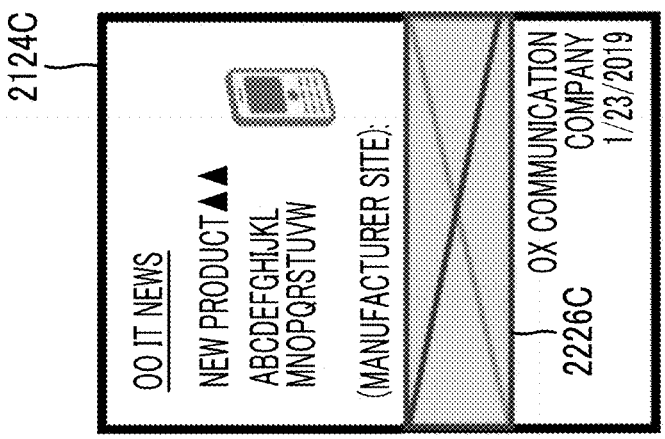
FIGS. 22A to 22C are diagrams illustrating a process example according to the exemplary embodiment.
Figure 22B:
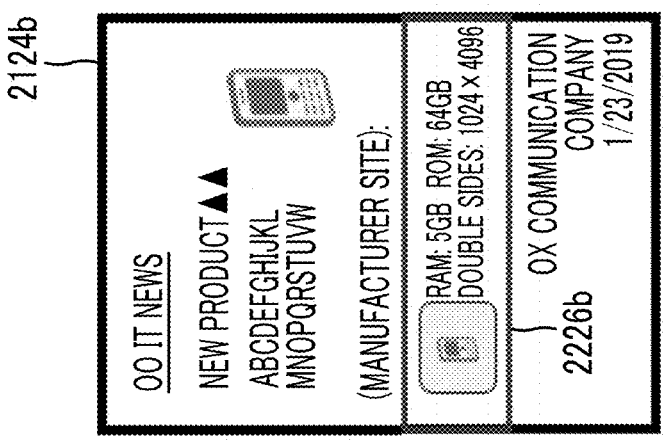
Figure 22A:
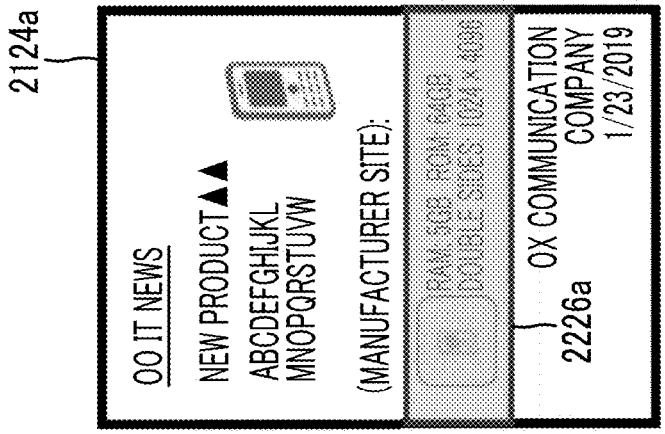

FIGS. 22A to 22C are diagrams illustrating a process example according to the exemplary embodiment. FIGS. 22A to 22C illustrate a display example in the reduced image display region 2124 illustrated in the example of FIG. 21.

The display example illustrated in FIG. 22A is a display example before it is set whether or not printing is performed. A processing regarding copyrights content 2226a in a reduced image display region 2124a is surrounded by a red frame, and the inside of the red frame is set to be light red. The display example is in the identical state as the state of the display example in FIG. 21.

The display example illustrated in FIG. 22B is a display example in a state of being set to "perform printing". A processing regarding copyrights content 2226b in a reduced image display region 2124b is surrounded by a red frame, and the inside of the red frame is set to be transparent. That is, the original content of the processing regarding copyrights content 2226b itself is displayed. The red frame indicating that the region is the content to need processing regarding copyrights is left as it is.

The display example illustrated in FIG. 22C is a display example in a state of being set to "not perform printing". A processing regarding copyrights content 2226c in a reduced image display region 2124c is surrounded by a red frame, and the inside of the red frame is displayed by "x". That is, the content of the processing regarding copyrights content 2226c is not displayed. The red frame indicating that the region is the content to need processing regarding copyrights is left as it is.

FIGS. 23A to 23D are diagrams illustrating a process example according to the exemplary embodiment. FIGS. 23A to 23D illustrate an example in which the image forming apparatus 200 performs printing. In the print example illustrated in FIGS. 23B to 23D, an unwanted element is edited in accordance with the use condition corresponding to the element, output data is generated by replacing the element with the processed element, and printing of the output data is performed.

The print example illustrated in FIG. 23A shows an example in which printing is performed by paying a fee. That is, a processing regarding copyrights content 2326a is printed on print paper 2300a. In this example, a print example in which a processing regarding copyrights content 2326a being an element subjected to processing regarding copyrights is surrounded by a dotted line in order to be identified is described. However, since a fee is paid, and the content is used by appropriately processing the copyright, printing of the dotted line indicating the processing regarding copyrights content 2326a may not be performed.

The print example illustrated in FIG. 23B shows an example of being set to "not perform printing". That is, a portion (processing regarding copyrights content 2326b) being the content to need processing regarding copyrights is blank in print paper 2300b. The red frame may or may not be drawn. An example in which "delete" is set as the use condition corresponding to the content is shown.

The print example illustrated in FIG. 23C shows an example of being set to "not perform printing". That is, a portion (processing regarding copyrights content 2326c) being the content to need processing regarding copyrights is printed to be blank in print paper 2300c in a state where information is degraded to the extent that the details are not recognized. An example in which "black for each character" is set as the use condition corresponding to the content is shown.

The print example illustrated in FIG. 23D shows an example of being set to "not perform printing". That is, in print paper 2300d, a portion (processing regarding copyrights content 2326d) being the content to need processing regarding copyrights is printed to be replaced with copyright information. Here, as the copyright information, for example, printing of information (specifically, URL in which the content is stored) for an access to the content to need processing regarding copyrights is performed. An example in which "replace the content with copyright information (access information to the content) is set as the use condition corresponding to the content is shown.

Figure 24A:
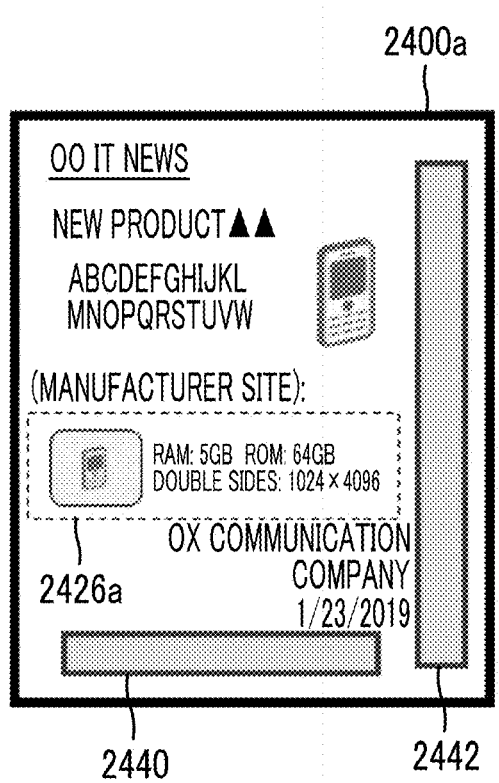
FIGS. 24A and 24B are diagrams illustrating a process example according to the exemplary embodiment.
Figure 24B:

FIGS. 24A and 24B are diagrams illustrating a process example according to the exemplary embodiment. FIGS. 24A and 24B illustrate an example in which the image forming apparatus 200 performs printing. In the print example illustrated in FIGS. 24A and 24B, an unwanted element is edited in accordance with the use condition corresponding to the element, output data is generated by replacing the element with the processed element, and printing of the output data is performed.

The print example illustrated in FIG. 24A shows an example in which printing (free) with an advertisement is selected by the user 450. Although there is no copyright fee, an advertisement is printed to be superimposed on the print paper 2400a. Specifically, an original processing regarding copyrights content 2426a is printed on print paper 2400a, but advertisement print regions 2440 and 2442 are also printed on the print paper.

In addition to the "Yes" button 2030 and the "No" button 2032 illustrated in the example of FIG. 20, a print button with an advertisement may be displayed as the user interface for printing with an advertisement.

The print example illustrated in FIG. 24B shows an example in which printing is performed by paying a fee. That is, a processing regarding copyrights content 2426b is printed on print paper 2400b. A digital watermark is printed to be superimposed on a portion (processing regarding copyrights content 2426b) managed with a copyright, and copying is prohibited. Here, the digital watermark may be one that degrades image quality in a case where the content is copied, or information that allows being traced in a case of being copied (for example, information indicating a user who has performed a printing instruction, and information indicating the image forming apparatus 200 that has performed printing) may be embedded.

A combination of the flowchart illustrated in the example of FIG. 5 and the flowchart illustrated in the example of FIG. 17 may be made in addition to a combination of the flowchart illustrated in the example of FIG. 5 and the flowchart illustrated in FIG. 11 and a combination of the flowchart illustrated in FIG. 16 and the flowchart illustrated in FIG. 17.

That is, the user terminal 300 may cause the user to select a content to need processing regarding copyrights, and the image forming apparatus 200 may also cause the user to select the content to need processing regarding copyrights.

In this case, priority is given to the selection in the image forming apparatus 200, which is the selection immediately before printing. In a case where different selections are made for the identical content (for example, in a case where it is selected that printing is required by the user terminal 300, but it is selected that printing is not required by the image forming apparatus 200, conversely, in a case where it is selected that printing is not required by the user terminal 300, but it is selected that printing is required by the image forming apparatus 200), a message indicating this may be displayed as a warning.

The selection by the image forming apparatus 200 and the user terminal 300 may be performed by a control of the image processing apparatus 100. That is, the image forming apparatus 200 and the user terminal 300 perform display for the user and receive an operation from the user, as the user interface. However, checking whether or not processing regarding copyrights is needed, and calculation of a fee may be performed by the image processing apparatus 100.

A hardware configuration example of the image processing apparatus 100 according to the exemplary embodiment will be described with reference to FIG. 25. The configuration illustrated in FIG. 25 is configured by, for example, a personal computer, and illustrates a hardware configuration example including a data reading unit 2517 such as a scanner and a data output unit 2518 such as a printer.

A CPU (abbreviation of a central processing unit) 2501 is a control unit that performs editing in accordance with a computer program in which execution sequences of various modules in the above exemplary embodiment are described, that is, execution sequences of the communication module 105, the communication-related editing module 110, the document acquisition module 115, the copyright information acquisition module 120, the use-condition presenting module 125, the use-necessity receiving module 130, the fee presenting module 135, the payment confirmation module 140, the output module 145, the extraction module 155, the element extraction module 160, the use-condition extraction module 165, the editing module 170, and the like are described.

A ROM (abbreviation of a read only memory) 2502 stores programs used by the CPU 2501, operation parameters, and the like. A RAM (abbreviation of a random access memory) 2503 stores programs used in the execution of the CPU 2501, parameters that appropriately change in the execution, and the like. The components are connected to each other by a host bus 2504 including a CPU bus and the like.

The host bus 2504 is connected to an external bus 2506 such as a PCI (abbreviation of a peripheral component interconnect/interface) bus through a bridge 2505.

A keyboard 2508 and a pointing device 2509 such as a mouse are devices operated by an operator. A display 2510 includes a liquid crystal display device, a CRT (abbreviation of a cathode ray tube), and the like, and displays various types of information as text information or image information. A touch screen or the like having both functions of the pointing device 2509 and the display 2510 may be used. In this case, regarding realization of the keyboard function, a keyboard (so-called software keyboard, screen keyboard, and the like) may be drawn on the screen (for example, touch screen) by software even though the keyboard function is not physically connected like the keyboard 2508. Thus, the keyboard function may be realized.

An HDD (abbreviation of a hard disk drive) 2511 includes a hard disk (may be a flash memory or the like in addition to the hard disk), drives the hard disk, and records or reproduces a program executed by the CPU 2501 and information. The HDD 2511 causes a function as the document storage module 150 or the like to be realized. Various other types of data, various computer programs, and the like are stored in the HDD.

A drive 2512 reads data or a program recorded on a removable recording medium 2513 such as a magnetic disk, an optical disk, a magneto-optical disk, or a semiconductor memory, which is mounted. The drive supplies the data or the program to the RAM 2503 connected through an interface 2507, an external bus 2506, the bridge 2505, and the host bus 2504. The removable recording medium 2513 may also be used as a data recording region.

A connection port 2514 is a port for connecting an external connection device 2515 and has a connection unit of a USB, IEEE1394, or the like. The connection port 2514 is connected to the CPU 2501 and the like via the interface 2507, the external bus 2506, the bridge 2505, the host bus 2504, and the like. A communication unit 2516 is connected to the communication line and performs data communication processing with the outside. The data reading unit 2517 is, for example, a scanner, and performs reading processing of a document. The data output unit 2518 is, for example, a printer, and performs output processing of document data.

Figure 26:
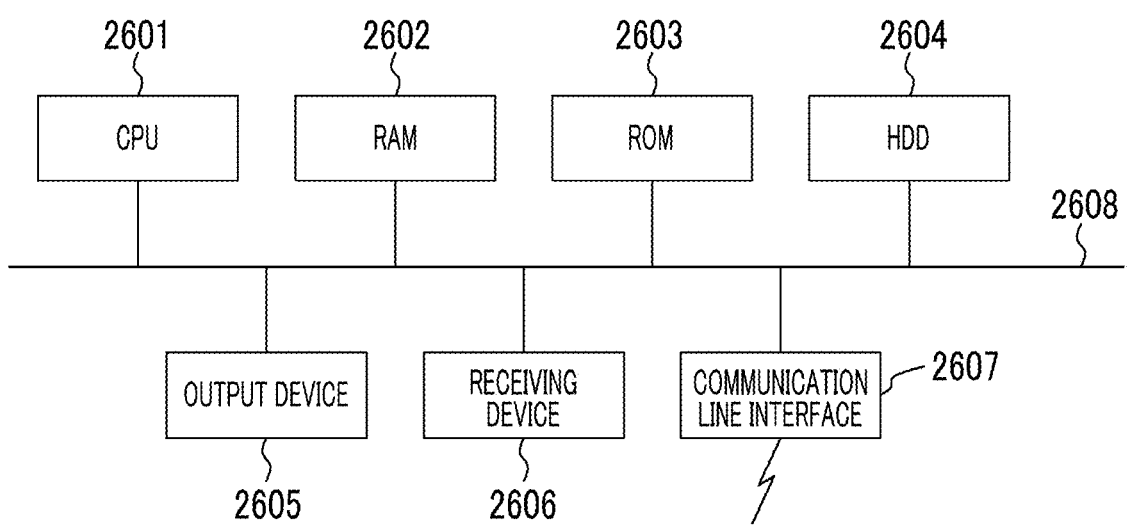
FIG. 26 is a block diagram illustrating a hardware configuration example of a computer realizing the exemplary embodiment.

A hardware configuration of a computer executing a program as the exemplary embodiment (image forming apparatus 200 and user terminal 300) is a hardware configuration of a general computer as illustrated in FIG. 26. Specifically, a personal computer, a computer which may function as a server, a portable information communication device, and the like may be provided. That is, as a specific example, a CPU 2601 is used as a processing unit (calculation unit), and a RAM 2602, a ROM 2603, and an HDD 2604 are used as a storage device. As the HDD 2604, for example, an HDD (abbreviation of a hard disk drive), and an SSD (abbreviation of a solid state drive) which is a flash memory may be used. The computer is configured in a manner that the CPU 2601, the RAM 2602, the ROM 2603, the HDD 2604, a reception device 2606, an output device 2605 such as a CRT, a liquid crystal display, or a speaker, and a communication line interface 2607 such as a network interface card are connected to the bus 2608 to transmit and receive data. The CPU 2601 executes programs of the communication module 205, the communication-related editing module 210, the document acquisition module 215, the element-copyright association information acquisition module 220, the fee editing module 225, the output data acquisition module 230, the user interface editing module 235, the document ID receiving module 240, the use-condition presenting module 245, the element use-necessity receiving module 250, the fee presenting module 255, the payment module 260, the output module 265, the printing module 270, the communication module 305, the communication-related editing module 310, the document acquisition module 315, the element-copyright association information acquisition module 320, the fee editing module 325, the output module 330, the user interface editing module 335, the document instruction module 340, the document-element-copyright information presenting module 345, the element use-necessity receiving module 350, the fee presenting module 355, and the output instruction receiving module 360. The RAM 2602 stores the programs or data. The ROM 2603 stores a program and the like for activating the computer. The HDD 2604 is an auxiliary storage device that stores a document, information regarding a copyright, information regarding a fee, and the like. The reception device 2606 receives data based on an operation (including an action, sound, a line of vision, and the like) of the user on the keyboard, the mouse, a touch screen, a microphone, a camera (including a visual line detection camera and the like). The communication line interface 2607 is used for a connection with a communication network. The plurality of computers may be connected to each other via a network.

Among the above-described exemplary embodiments, in a case of the embodiment based on a computer program, the computer program which is software is read to a system having the present hardware configuration, and the exemplary embodiment is realized through cooperation between the software and the hardware resources.

The hardware configuration illustrated in FIGS. 25 and 26 corresponds to one configuration example, and the exemplary embodiment is not limited to the configuration illustrated in FIGS. 25 and 26, and any configuration in which the modules described in the exemplary embodiment can be executed may be used. For example, some of the modules may be configured with dedicated hardware (for example, an application specific integrated circuit (ASIC) or a field-programmable gate array (FPGA)), some of the modules may be provided in an external system, and may be connected to a communication line, and such a plurality of systems illustrated in FIGS. 25 and 26 may be connected to each other via a communication line so as to operate in cooperation therebetween. Particularly, the modules may be incorporated not only into a personal computer but also into a portable information communication device (including a mobile phone, a smartphone, a mobile apparatus, a wearable computer, and the like), an information appliance, a robot, a copier, a facsimile, a scanner, a printer, a multi-function peripheral (an image processing apparatus having two or more functions of a scanner, a printer, copier, and a facsimile).

The program may be stored on a recording medium so as to be provided, and the program may be provided by using communication means. In this case, for example, the program may be understood as the invention of a "non-transitory computer readable medium storing the program".

The "non-transitory computer readable medium storing the program" indicates a computer readable recording medium storing the program, used to install, execute, and distribute the program.

Examples of the recording medium include "DVD-R, DVD-RW, and DVD-RAM" which is for a digital versatile disc (DVD) and is a standard established by the DVD Forum and "DVD+R and DVD+RW which is a standard established by DVD+RW; a read-only memory (CD-ROM), CD recordable (CD-R), and CD rewritable (CD-RW) being for a compact disc (CD); Blu-ray (registered trademark) discs; a magneto-optical disk (MO), a flexible disk (FD), a magnetic tape, a hard disk, a read-only memory (ROM), an electrically erasable programmable read-only memory (EEPROM (registered trademark)), a flash memory, a random access memory (RAM), and a secure digital (SD) memory card.

The whole or a part of the program may be recorded on the recording medium so as to be preserved or distributed. The program may be transmitted through communication, for example, by using a wired network used for a local area network (LAN), a metropolitan area network (MAN), a wide area network (WAN), the Internet, an intranet, or an extranet, a wireless communication network, or a combination thereof, and may be carried via a carrier wave mounted therewith.

The program may be a part of the whole of another program, or may be recorded on a recording medium along with a separate program. The program may be divided and recorded on a plurality of recording media. The program may be recorded in any restorable aspect such as compression or encryption.

2. An image processing apparatus comprising:
a receiving section that receives designation of wanted and unwanted elements that need processing regarding copyrights among elements constituting a document; and
an output section that edits an unwanted element, generates output data by replacing the element with the processed element, and outputs the output data.

19. A non-transitory computer readable medium storing an image processing program causing a computer to function as:
an acquisition section that acquires a document;
a first extraction section that extracts elements that need processing regarding copyrights from elements constituting the acquired document;
a second extraction section that extracts use conditions of the extracted elements;
a first presenting unit that presents at least part of the extracted use conditions;
a receiving section that receives designation of wanted and unwanted elements among the extracted elements;
a second presenting section that presents a total fee obtained by adding fees indicated by use conditions of the wanted elements to a fee for outputting the document; and
an output section that, in response to payment of the total fee, outputs the edited document,
wherein, in the edited document, the unwanted elements have been edited to comply with the use conditions.

20. A non-transitory computer readable medium storing an image processing program causing a computer to function as:
a receiving section that receives designation of wanted and unwanted elements that need processing regarding copyrights among elements constituting a document; and an output section that edits an unwanted element, generates output data by replacing the element with the processed element, and outputs the output data.

21. A non-transitory computer readable medium storing an image processing program causing a computer to function as:
a first receiving section that receives information for identifying a document;
a first presenting section that presents use conditions of elements that need processing regarding copyrights among elements of the document;
a second receiving section that receives designation of wanted and unwanted elements among the elements that need processing regarding copyrights;
a second presenting section that presents a total fee obtained by adding fees indicated by use conditions of the wanted elements to a fee for outputting an edited the document;
a payment section that processes payment of the total fee; and
an output section that outputs the edited document,
wherein, in the edited document, the unwanted elements have been edited to comply with the use conditions.

22. A non-transitory computer readable medium storing an image processing program causing a computer to function as:
an instruction section that performs an instruction of a document;

a first presenting section that presents use conditions of elements that need processing regarding copyrights among elements of the document;

a receiving section that receives designation of wanted and unwanted elements among the elements that need processing regarding copyrights;

a second presenting section that presents the total fee obtained by adding fees indicated by use conditions of the wanted elements to a fee for outputting an edited document; and an output section that, in response to payment of the total fee, outputs the edited document, wherein, in the edited document, the unwanted elements have been edited to comply with the use conditions.

23. An image processing system comprising:

a first image processing apparatus including:
an instruction section that performs an instruction of a document,
a first presenting section that presents a use condition of a copyright of an element that needs processing regarding copyrights among elements constituting the document of which the instruction is received,
a first receiving section that receives an instruction of a use necessity of each element that needs the processing regarding copyrights,
a second presenting section that presents the total fee obtained by adding a fee indicated by a use condition corresponding to the wanted element, to a fee for outputting the document, and
a first output section that generates an output request for the document including use necessity information of each element of which the instruction is received and outputs the generated output request to a second image processing apparatus;

the second image processing apparatus including:
an acquisition section that acquires the document of which the instruction is received,
a first extraction section that extracts an element that needs the processing regarding copyrights among elements constituting the acquired document,
a second extraction section that extracts a use condition of a copyright of the extracted element,
a second receiving section that presents a use condition corresponding to each extracted element and receives an instruction of a use necessity of the corresponding element,
a third presenting section that presents the total fee obtained by adding a fee indicated by a use condition corresponding to the wanted element, to a fee for outputting the document, and
a second output section that, in response to payment of the total fee, processes the unwanted element, in accordance with a use condition corresponding to the element, generates output data by replacing the element with the processed element, and outputs the generated output data to a third image processing apparatus; and the third image processing apparatus including:
a third receiving section that receives information for identifying the document of which the instruction is received,
a fourth presenting section that presents a use condition of a copyright of an element that needs processing regarding copyrights among elements constituting the document identified by the information,
a fourth receiving section that receives an instruction of a use necessity of each element, a fifth presenting section that presents the total fee obtained by adding a fee indicated by a use condition corresponding to the wanted element, to a fee for outputting the document,
a payment section that processes payment of the total fee, and
a third output section that processes the unwanted element, in accordance with a use condition corresponding to the element, and outputs output data generated by replacing the element with the processed element.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a processor, configured to:
acquire a document;
extract elements that need processing regarding copyrights from elements constituting the acquired document;
extract use conditions of the extracted elements;
present at least part of the extracted use conditions;
receive designation of wanted and unwanted elements among the extracted elements;
present a total fee obtained by adding fees indicated by use conditions of the wanted elements to a fee for outputting the document; and
in response to payment of the total fee, output the edited document,
wherein, in the edited document, the unwanted elements have been edited to comply with the use conditions.

2. The image processing apparatus according to claim 1, wherein the processor performs processing of deleting the wanted elements.

3. The image processing apparatus according to claim 1, wherein, when outputting the edited document, the processor degrades the unwanted element.

4. The image processing apparatus according to claim 1, wherein, when outputting the edited document, the processor replaces the unwanted elements with information related to copyrights of the unwanted elements.

5. The image processing apparatus according to claim 1, wherein, when outputting the document, the processor adds information related to copyrights of the wanted elements.

6. The image processing apparatus according to claim 1, wherein, in response to a predetermined instruction, the processor outputs the edited document to include the wanted elements and an advertisement.

7. The image processing apparatus according to claim 6, wherein, in the edited document, position of the advertisement is arranged so as to avoid any other elements in the document.

8. The image processing apparatus according to claim 1, wherein the processor edits each element of the unwanted elements as specified by the use conditions of the each element.

9. The image processing apparatus according to claim 8, wherein superimposition of a watermark on the element is specified by the use conditions.

10. The image processing apparatus according to claim 8, wherein changing resolution of the element is specified by the use conditions.

11. An image processing apparatus comprising:
a processor, configured to:
receive information for identifying a document;
present use conditions of elements that need processing regarding copyrights among elements of the document;
receive designation of wanted and unwanted elements among the elements that need processing regarding copyrights;
present a total fee obtained by adding fees indicated by use conditions of the wanted elements to a fee for outputting an edited the document;
process payment of the total fee; and
output the edited document,
wherein, in the edited document, the unwanted elements have been edited to comply with the use conditions.

12. The image processing apparatus according to claim 11, further comprising:
a display that displays the document in such manner that the elements that need processing regarding copyrights are distinguishable from other elements.

13. The image processing apparatus according to claim 12, wherein the display further displays information related to copyrights of the elements that need processing regarding copyrights.

14. The image processing apparatus according to claim 13, wherein the information related to copyrights of the elements includes at least one of a copyright management number, information about a copyright holder, citation source information, and summary information.

15. The image processing apparatus according to claim 12, wherein the processor presents fees for outputting the elements that need processing regarding copyrights, as the at least part of the extracted conditions.

16. The image processing apparatus according to claim 15, wherein the processor presents a total fee for using the wanted elements.

17. An image processing apparatus comprising:
a processor, configured to:
perform an instruction of a document;
present use conditions of elements that need processing regarding copyrights among elements of the document;
receive designation of wanted and unwanted elements among the elements that need processing regarding copyrights;
present the total fee obtained by adding fees indicated by use conditions of the wanted elements to a fee for outputting an edited document; and
in response to payment of the total fee, output the edited document,
wherein, in the edited document, the unwanted elements have been edited to comply with the use conditions.

18. The image processing apparatus according to claim 17, further comprising:
a display that displays the document in such manner that the elements that need processing regarding copyrights are distinguished from other elements.

19. The image processing apparatus according to claim 18, wherein the display further displays information related to copyrights of the elements that need processing regarding copyrights.

20. The image processing apparatus according to claim 19, wherein the information related to copyrights of the elements that need copyright processing includes at least one of a copyright management number, information about a copyright holder, citation source information, and summary information.

* * * * *